US012590828B2

(12) United States Patent
Pearson et al.

(10) Patent No.: US 12,590,828 B2
(45) Date of Patent: Mar. 31, 2026

(54) METHODS AND APPARATUS FOR MASS ESTIMATION FOR A VEHICLE

(71) Applicant: Ford Global Technologies, LLC, Dearborn, MI (US)

(72) Inventors: Elliott George Pearson, Shelby Township, MI (US); Madeleine Scanlon Moir, Superior Charter Township, MI (US); Michael Scott Goebelbecker, Plymouth, MI (US); Bradley George Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 18/592,214

(22) Filed: Feb. 29, 2024

(65) Prior Publication Data

US 2025/0277690 A1 Sep. 4, 2025

(51) Int. Cl.
*G01G 19/08* (2006.01)
*G07C 5/02* (2006.01)

(52) U.S. Cl.
CPC ............. *G01G 19/086* (2013.01); *G07C 5/02* (2013.01)

(58) Field of Classification Search
CPC ................................ G01G 19/086; G07C 5/02
USPC ....................................................... 701/32.1
See application file for complete search history.

(56) References Cited

U.S. PATENT DOCUMENTS

| | | |
|---|---|---|
| 7,761,258 B2 | 7/2010 | Brown |
| 10,013,967 B2 | 7/2018 | Zafeiropoulos |
| 10,060,782 B2 | 8/2018 | Pita-Gil |
| 10,933,824 B2 | 3/2021 | Niedert et al. |
| 10,990,822 B2 | 4/2021 | Rogness et al. |
| 11,008,014 B2 * | 5/2021 | Pearson ............... B60W 40/13 |
| 11,066,081 B2 | 7/2021 | Niedert et al. |

(Continued)

FOREIGN PATENT DOCUMENTS

| | | | | |
|---|---|---|---|---|
| DE | 102017212225 A1 * | 1/2019 | ......... | B60G 17/0165 |

OTHER PUBLICATIONS

Moustapha Doumiati, Alessandro Victorino, Ali Charara, Guillaume Baffet, Daniel Lechner, "An estimation process for vehicle wheel-ground contact normal forces," IFAC Proceedings Volumes, vol. 41, issue 2, 2008, pp. 7110-7115. https://doi.org/10.3182/20080706-5-KR-1001.01205 (Year: 2008).*

*Primary Examiner* — Matthias S Weisfeld
*Assistant Examiner* — Hyang Ahn
(74) *Attorney, Agent, or Firm* — Lorne Forsythe; Hanley, Flight & Zimmerman, LLC

(57) ABSTRACT

Methods and apparatus for mass estimation for a vehicle are disclosed. An example apparatus disclosed herein includes at least one processor circuit to determine a first position of a first reference point on a suspension system of a vehicle, the first position corresponding to the vehicle in a first state, determine a second position of the first reference point based on (a) sensor data from an accelerometer positioned on the suspension system and (b) relative positions of second reference points on the suspension system, the second position corresponding to the vehicle in a second state, determine, based on the first and second positions, a wheel-end force corresponding to a wheel of the vehicle, determine, based on the wheel-end force, an axle mass corresponding to an axle of the vehicle, and determine, based on the axle mass, a vehicle mass of the vehicle.

20 Claims, 15 Drawing Sheets

(56)        References Cited

U.S. PATENT DOCUMENTS

| | | | | |
|---|---|---|---|---|
| 11,364,920 | B2 | 6/2022 | Rogness et al. | |
| 11,796,380 | B2 | 10/2023 | Michelini et al. | |
| 11,975,724 | B2 * | 5/2024 | Rogness | B60W 40/13 |
| 2010/0198527 | A1 | 8/2010 | Gouriet et al. | |
| 2015/0204715 | A1 * | 7/2015 | Pita-Gil | G01G 19/022 |
| | | | | 382/104 |
| 2018/0313423 | A1 * | 11/2018 | Laird | F16F 9/0245 |
| 2022/0063365 | A1 * | 3/2022 | Chetty | B60G 17/01908 |
| 2023/0415535 | A1 * | 12/2023 | Mistry | B60W 10/22 |
| 2024/0271987 | A1 * | 8/2024 | Diet | G01G 5/006 |

* cited by examiner

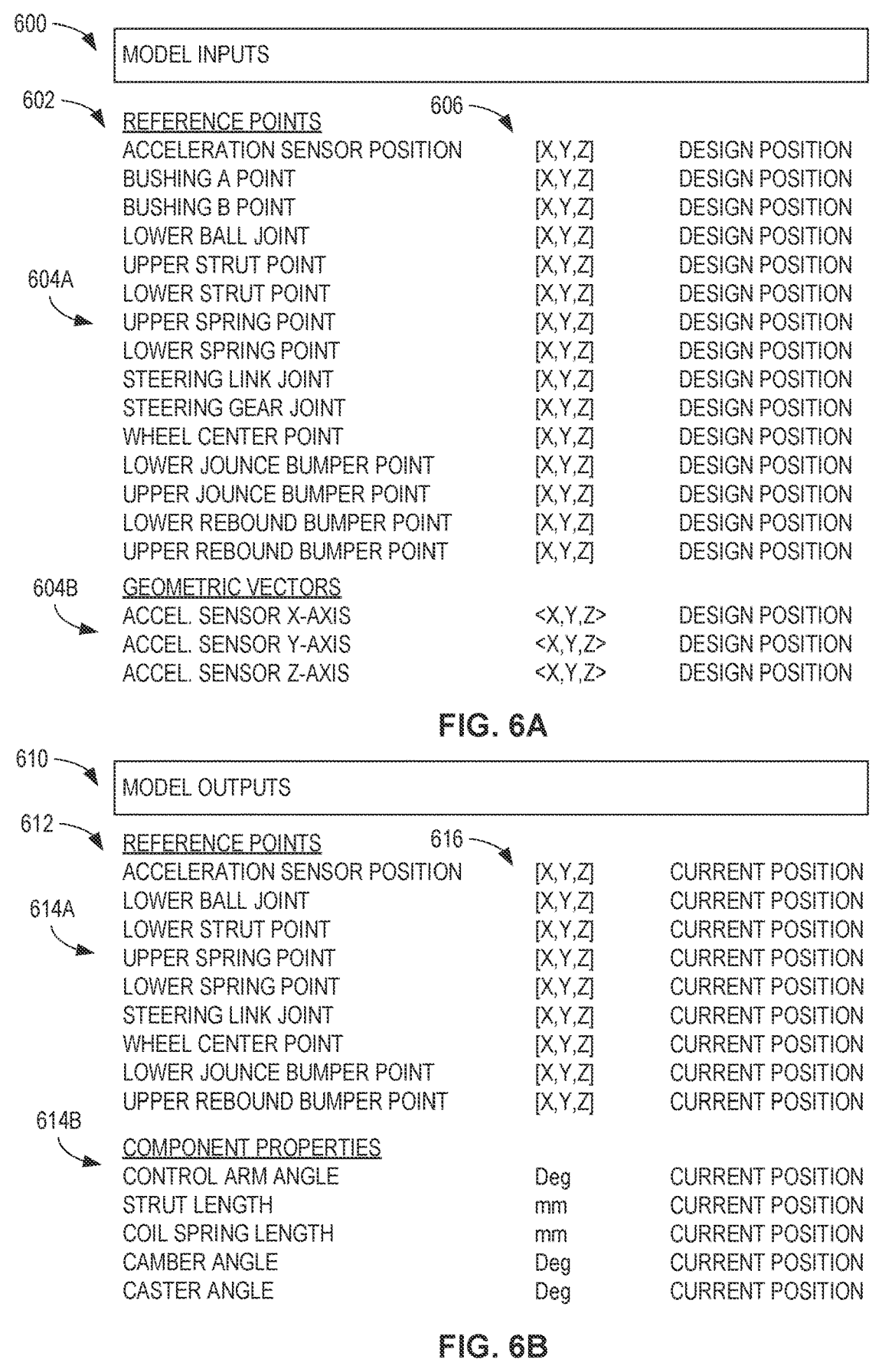

600 —

| MODEL INPUTS |
|---|

602 —

606 —

REFERENCE POINTS

| | | |
|---|---|---|
| ACCELERATION SENSOR POSITION | [X,Y,Z] | DESIGN POSITION |
| BUSHING A POINT | [X,Y,Z] | DESIGN POSITION |
| BUSHING B POINT | [X,Y,Z] | DESIGN POSITION |
| LOWER BALL JOINT | [X,Y,Z] | DESIGN POSITION |
| UPPER STRUT POINT | [X,Y,Z] | DESIGN POSITION |
| LOWER STRUT POINT | [X,Y,Z] | DESIGN POSITION |
| UPPER SPRING POINT | [X,Y,Z] | DESIGN POSITION |
| LOWER SPRING POINT | [X,Y,Z] | DESIGN POSITION |
| STEERING LINK JOINT | [X,Y,Z] | DESIGN POSITION |
| STEERING GEAR JOINT | [X,Y,Z] | DESIGN POSITION |
| WHEEL CENTER POINT | [X,Y,Z] | DESIGN POSITION |
| LOWER JOUNCE BUMPER POINT | [X,Y,Z] | DESIGN POSITION |
| UPPER JOUNCE BUMPER POINT | [X,Y,Z] | DESIGN POSITION |
| LOWER REBOUND BUMPER POINT | [X,Y,Z] | DESIGN POSITION |
| UPPER REBOUND BUMPER POINT | [X,Y,Z] | DESIGN POSITION |

604A

604B

GEOMETRIC VECTORS

| | | |
|---|---|---|
| ACCEL. SENSOR X-AXIS | <X,Y,Z> | DESIGN POSITION |
| ACCEL. SENSOR Y-AXIS | <X,Y,Z> | DESIGN POSITION |
| ACCEL. SENSOR Z-AXIS | <X,Y,Z> | DESIGN POSITION |

| MODEL OUTPUTS |
|---|

612 —

616 —

REFERENCE POINTS

| | | |
|---|---|---|
| ACCELERATION SENSOR POSITION | [X,Y,Z] | CURRENT POSITION |
| LOWER BALL JOINT | [X,Y,Z] | CURRENT POSITION |
| LOWER STRUT POINT | [X,Y,Z] | CURRENT POSITION |
| UPPER SPRING POINT | [X,Y,Z] | CURRENT POSITION |
| LOWER SPRING POINT | [X,Y,Z] | CURRENT POSITION |
| STEERING LINK JOINT | [X,Y,Z] | CURRENT POSITION |
| WHEEL CENTER POINT | [X,Y,Z] | CURRENT POSITION |
| LOWER JOUNCE BUMPER POINT | [X,Y,Z] | CURRENT POSITION |
| UPPER REBOUND BUMPER POINT | [X,Y,Z] | CURRENT POSITION |

614A

614B

COMPONENT PROPERTIES

| | | |
|---|---|---|
| CONTROL ARM ANGLE | Deg | CURRENT POSITION |
| STRUT LENGTH | mm | CURRENT POSITION |
| COIL SPRING LENGTH | mm | CURRENT POSITION |
| CAMBER ANGLE | Deg | CURRENT POSITION |
| CASTER ANGLE | Deg | CURRENT POSITION |

FIG. 6B

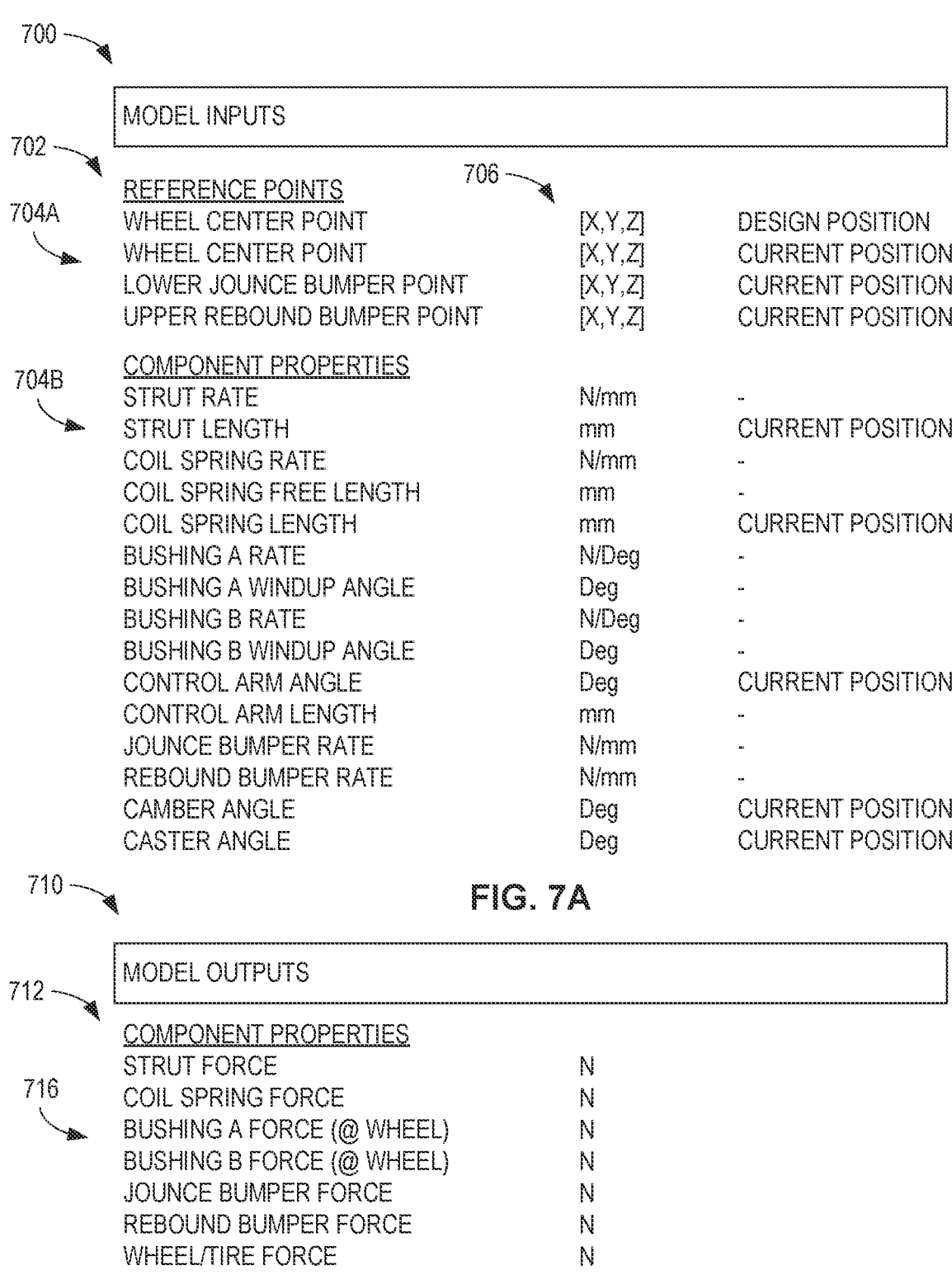

700

702

704A

706

MODEL INPUTS

REFERENCE POINTS
| | | |
|---|---|---|
| WHEEL CENTER POINT | [X,Y,Z] | DESIGN POSITION |
| WHEEL CENTER POINT | [X,Y,Z] | CURRENT POSITION |
| LOWER JOUNCE BUMPER POINT | [X,Y,Z] | CURRENT POSITION |
| UPPER REBOUND BUMPER POINT | [X,Y,Z] | CURRENT POSITION |

704B

COMPONENT PROPERTIES
| | | |
|---|---|---|
| STRUT RATE | N/mm | - |
| STRUT LENGTH | mm | CURRENT POSITION |
| COIL SPRING RATE | N/mm | - |
| COIL SPRING FREE LENGTH | mm | - |
| COIL SPRING LENGTH | mm | CURRENT POSITION |
| BUSHING A RATE | N/Deg | - |
| BUSHING A WINDUP ANGLE | Deg | - |
| BUSHING B RATE | N/Deg | - |
| BUSHING B WINDUP ANGLE | Deg | - |
| CONTROL ARM ANGLE | Deg | CURRENT POSITION |
| CONTROL ARM LENGTH | mm | - |
| JOUNCE BUMPER RATE | N/mm | - |
| REBOUND BUMPER RATE | N/mm | - |
| CAMBER ANGLE | Deg | CURRENT POSITION |
| CASTER ANGLE | Deg | CURRENT POSITION |

MODEL OUTPUTS

COMPONENT PROPERTIES
| | |
|---|---|
| STRUT FORCE | N |
| COIL SPRING FORCE | N |
| BUSHING A FORCE (@ WHEEL) | N |
| BUSHING B FORCE (@ WHEEL) | N |
| JOUNCE BUMPER FORCE | N |
| REBOUND BUMPER FORCE | N |
| WHEEL/TIRE FORCE | N |

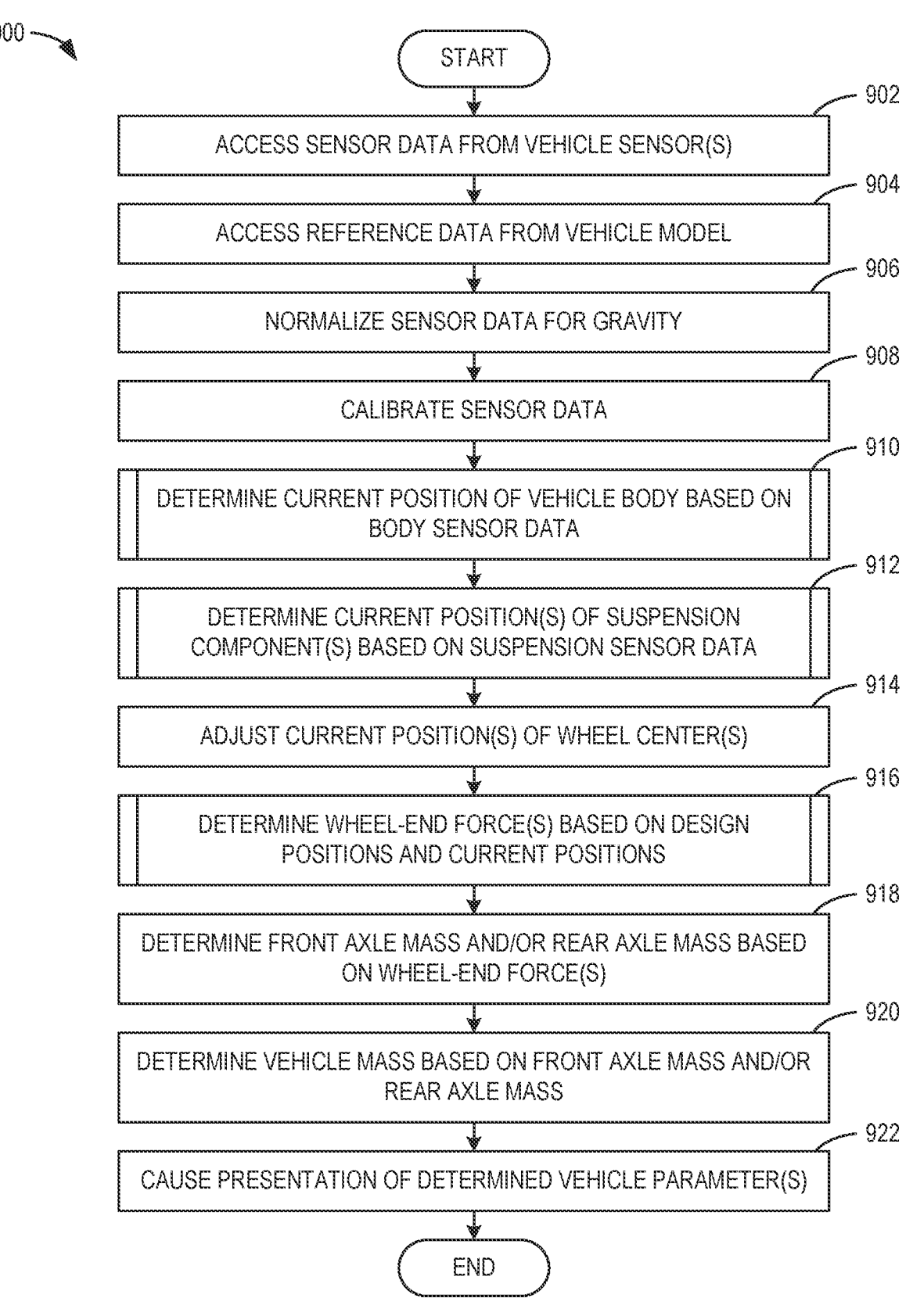

START

ACCESS SENSOR DATA FROM VEHICLE SENSOR(S) — 902

ACCESS REFERENCE DATA FROM VEHICLE MODEL — 904

NORMALIZE SENSOR DATA FOR GRAVITY — 906

CALIBRATE SENSOR DATA — 908

DETERMINE CURRENT POSITION OF VEHICLE BODY BASED ON BODY SENSOR DATA — 910

DETERMINE CURRENT POSITION(S) OF SUSPENSION COMPONENT(S) BASED ON SUSPENSION SENSOR DATA — 912

ADJUST CURRENT POSITION(S) OF WHEEL CENTER(S) — 914

DETERMINE WHEEL-END FORCE(S) BASED ON DESIGN POSITIONS AND CURRENT POSITIONS — 916

DETERMINE FRONT AXLE MASS AND/OR REAR AXLE MASS BASED ON WHEEL-END FORCE(S) — 918

DETERMINE VEHICLE MASS BASED ON FRONT AXLE MASS AND/OR REAR AXLE MASS — 920

CAUSE PRESENTATION OF DETERMINED VEHICLE PARAMETER(S) — 922

END

FIG. 9

METHODS AND APPARATUS FOR MASS ESTIMATION FOR A VEHICLE

FIELD OF THE DISCLOSURE

This disclosure relates generally to vehicles and, more particularly, to methods and apparatus for mass estimation for a vehicle.

BACKGROUND

Some vehicles (e.g., vans, trucks, sports utility vehicles (SUVs), etc.) can carry significant loads and often have weight limits that should not be exceeded. As such, to ensure proper vehicle handling and/or performance during normal use, a vehicle should not be loaded (e.g., with people, cargo, freight, etc.) greater than a weight limit of the vehicle. A user of the vehicle can visually inspect the vehicle to determine if a vehicle is overloaded. Alternatively, a vehicle can be driven to a weight station to determine of a weight and/or load of the vehicle.

SUMMARY

An example apparatus disclosed herein includes at least one processor circuit to determine a first position of a first reference point on a suspension system of a vehicle, the first position corresponding to the vehicle in a first state, and determine a second position of the first reference point based on (a) sensor data from an accelerometer positioned on the suspension system, and (b) relative positions of second reference points on the suspension system, the second position corresponding to the vehicle in a second state. The at least one processor circuit is further to determine, based on the first and second positions, a wheel-end force corresponding to a wheel of the vehicle, determine, based on the wheel-end force, an axle mass corresponding to an axle of the vehicle, and determine, based on the axle mass, a vehicle mass of the vehicle.

At least one example non-transitory machine-readable medium disclosed herein includes machine-readable instructions to cause at least one processor circuit to at least determine a first position of a first reference point on a suspension system of a vehicle, the first position corresponding to the vehicle in a first state, and determine a second position of the first reference point based on (a) sensor data from an accelerometer positioned on the suspension system, and (b) relative positions of second reference points on the suspension system, the second position corresponding to the vehicle in a second state. The machine-readable instructions are to further cause one or more of the at least one processor circuit to determine, based on the first and second positions, a wheel-end force corresponding to a wheel of the vehicle, determine, based on the wheel-end force, an axle mass corresponding to an axle of the vehicle, and determine, based on the axle mass, a vehicle mass of the vehicle.

An example method disclosed herein includes determining a first position of a first reference point on a suspension system of a vehicle, the first position corresponding to the vehicle in a first state, and determining a second position of the first reference point based on (a) sensor data from an accelerometer positioned on the suspension system, and (b) relative positions of second reference points on the suspension system, the second position corresponding to the vehicle in a second state. The method further includes determining, based on the first and second positions, a wheel-end force corresponding to a wheel of the vehicle, determining, based on the wheel-end force, an axle mass corresponding to an axle of the vehicle, and determining, based on the axle mass, a vehicle mass of the vehicle.

BRIEF DESCRIPTION OF THE DRAWINGS

FIG. 6A is a first example table representative of example design positions that may be included in example reference data for the example vehicle of FIG. 1.

FIG. 6B is a second example table representative of example output parameters that can be determined by the example mass estimation circuitry of FIGS. 1 and/or 5.

FIG. 7A is a third example table representative of example input data utilized by the example mass estimation circuitry of FIGS. 1 and/or 5 to estimate an example wheel-end force of the example vehicle of FIG. 1.

FIG. 7B is a fourth example table representative of example suspension component forces determined by the mass estimation circuitry of FIGS. 1 and/or 5.

FIG. 9 is a flowchart representative of example machine readable instructions and/or example operations that may be executed, instantiated, and/or performed by example programmable circuitry to implement the mass estimation circuitry 102 of FIGS. 1 and/or 5.

Figure 1:
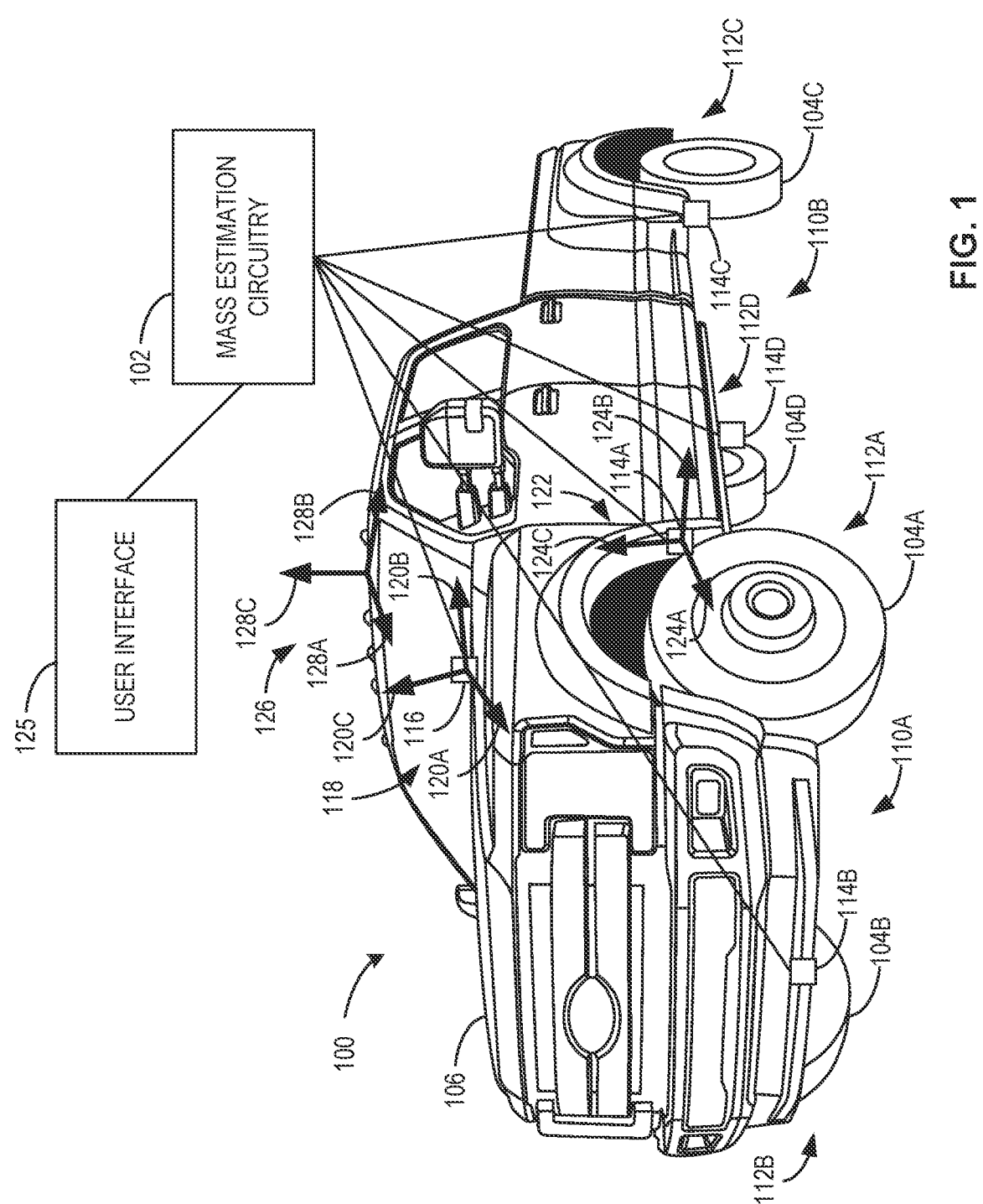
FIG. 1 illustrates an example vehicle implementing example mass estimation circuitry in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle.

As used herein, the "weight" of a vehicle refers to the gross weight of a vehicle unless indicated otherwise. As used herein, the "load" on a vehicle refers to the difference between the gross weight of a vehicle and the curb weight of a vehicle (e.g., the weight of the vehicle hardware and consumables, etc.). The load on a vehicle typically includes the weight added by a user of a vehicle (e.g., the weight of the passengers of the vehicle, cargo loaded in the vehicle, etc.). As used herein, the "load condition" of a vehicle refers to the load on a vehicle as well as the distribution of the load on the vehicle. As used herein, the phrase "misloading a vehicle" and all variations thereof, refers to a load condition that adversely affects the performance of the vehicle, and can, for example, include exceeding the gross axle weight rating (GAWR) of one or both axles, exceeding a weight rating of a suspension system, unbalancing a weight distribution associated with the vehicle, etc.

Drivers often desire to know vehicle weight and/or vehicle weight distribution of a vehicle to improve loading practices, comply with regulatory weight limits, and/or facilitate vehicle handling. As such, some vehicles include vehicle weight measurement systems to measure vehicle weight when the vehicle is in motion and/or stationary. Some known vehicle weight measurement systems calculate suspension position at one or more wheels of a vehicle by generating a vehicle-specific transfer function to relate inputs (e.g., sensor measurements) to outputs (e.g., suspension position). Such vehicle weight measurement systems can generate a characteristic curve for respective one(s) of the wheels based on the vehicle-specific transfer function, and the characteristic curves can be used to estimate additional vehicle properties such as vehicle weight, wheel-end force, mass, etc.

However, some known vehicle weight measurement systems based on measuring suspension position can have significant error factors, which can decrease the accuracy of the resulting vehicle weight measurements. For instance, direct sensing of the suspension position using rotary and/or linear suspension position sensors necessitates physical connection to both a rigid vehicle body and moving suspension system component(s), which often necessitates complex and/or multi-part linkages. Such linkages may introduce additional sources of error in the suspension position calculation as a result of movement of the suspension system component(s) and/or the linkages. Further, placement of the sensor and/or a sizing and/or arrangement of the linkage may be specific to a particular type and/or geometry of the suspension system. As a result, different linkages may be designed for different suspension systems, thereby increasing costs associated with the various unique parts to be manufactured, sealed, and/or weather-proofed.

Additionally, due to material and manufacturing variations between different vehicles, weight estimations using measurements from suspension-based sensors must be calibrated for each vehicle during the manufacturing and/or assembly of the vehicle. Typically, the sensor output of each suspension-based sensor is calibrated for the individual suspension of each manufactured vehicle, where such calibration may require physically loading the vehicle from a curb weight (e.g., a weight including fuel but not including passengers or cargo) to the GAWR (e.g., the weight including fuel, passengers, and/or cargo) of the vehicle. Such a calibration process can add time and/or cost to the manufacturing and assembly of the vehicle.

Further, because the calibration process is performed during manufacture of the vehicle, accuracy of the calibration can begin to drift as the suspension wears during use and properties of the suspension system change, thus introducing additional error into the weight measurement. Known suspension-based sensors and weight estimation techniques (e.g., using vehicle-specific transfer functions) typically do not incorporate feedback to account for the properties of the suspension system changing over time. Further, vehicle-specific transfer functions do not account for individual contributions from component rates (e.g., relating displacement and/or deformation of a component to force on the component) and/or component geometry (e.g., a sensor origin location, a rotational axis of a lower control arm, etc.) associated with one or more components (e.g., springs, bushings, jounce bumpers, etc.) of the suspension system. As a result, removal and/or replacement of one(s) of the components typically necessitates recalibration of the vehicle-specific transfer functions and/or the resulting characteristic curve(s), where such recalibration can be costly and/or time-consuming. However, without recalibration of the transfer functions in the event of wear, removal, and/or replacement of one or more parts, some known vehicle weight measurement systems can produce inaccurate weight measurements. Accurate measurements of vehicle loads are required to ensure the vehicle is not misloaded. In some instances, misloading a vehicle can cause the vehicle to prematurely degrade and/or can reduce the effectiveness of vehicle safety systems.

Methods and apparatus to estimate vehicle mass are disclosed. Examples disclosed herein estimate and/or determine an example mass (e.g., a vehicle mass, an axle mass, etc.) associated with a vehicle, and present and/or display the mass (e.g., to a driver, a passenger, vehicle service personnel, etc.) to facilitate loading and/or operation of the vehicle. Example mass estimation circuitry disclosed herein utilizes known suspension system geometry and measurement data from one or more tri-axis accelerometers positioned on the vehicle to estimate vehicle mass. For example, the mass estimation circuitry obtains first measurement data (e.g., first acceleration measurements) from a first sensor (e.g., a body sensor, a first tri-axis accelerometer) positioned on a vehicle body of the vehicle, and second measurement data (e.g., second acceleration measurements) from one or more second sensors (e.g., suspensions sensors, second tri-axis accelerometers) positioned on respective suspension systems of the vehicle. In some examples, the mass estimation circuitry identifies one or more reference points on the vehicle, where the reference points correspond to respective different features and/or components of the suspension systems. In such examples, the mass estimation circuitry determines first example positions (e.g., design positions, initial positions) of the respective reference points, where the first positions represent expected locations of the reference points (e.g., relative to a fixed, global coordinate system) when the vehicle is at a design state (e.g., an expected state). Additionally, the mass estimation circuitry determines second positions (e.g., current positions, actual positions) of the reference points, where the second positions represent locations of the reference points (e.g., relative to the global coordinate system) when the vehicle is in a current state (e.g., is loaded and/or in operation).

In some examples, based on differences (e.g., distances) between the first positions and the corresponding second positions of the reference points, the mass estimation circuitry can estimate example wheel-end forces corresponding to respective wheels of the vehicle. Further, based on the wheel-end forces, the mass estimation circuitry determines at least one of a front axle mass, a rear axle mass, or a vehicle mass (e.g., a total vehicle mass) of the vehicle. In some examples, the mass estimation circuitry can present the determined mass value(s) (e.g., the front axle mass, the rear axle mass, and/or the vehicle mass) to an operator via an example user interface. In some examples, by estimating the vehicle mass based measurement data from tri-axis accelerometers and/or based on relative locations of one or more reference points on the vehicle, examples disclosed herein improve accuracy of mass estimation for a vehicle (e.g., compared to known mass estimation techniques using vehicle-specific transfer functions). For example, by utilizing tri-axis accelerometers to estimate positions of suspension system components, examples disclosed herein reduce a need for complex, multi-part mechanical linkage systems typically used with rotary and/or linear suspension position sensors. As a result, examples disclosed herein reduce manufacturing and/or part costs associated with the suspension systems of the vehicle, and/or reduce error in the mass estimation by reducing a number of moving parts in the system. Further, by indirectly sensing positions of suspension components based on acceleration data, examples disclosed herein can be utilized across various suspension types and/or geometries without necessitating re-calibration and/or re-design of the suspension system and/or the associated sensor(s). Additionally, examples disclosed herein can adjust force and/or mass estimations based on prognostic data to account for changes in component properties due to wear and/or aging of the suspension components, thus improving accuracy of the estimations compared to known mass estimation techniques.

FIG. 1 illustrates an example vehicle 100 implementing example mass estimation circuitry 102 in accordance with teachings of this disclosure. In the illustrated example of FIG. 1, the vehicle 100 is a truck. In some examples, the vehicle 100 can be a different type of vehicle (e.g., a sedan, a van, a sport utility vehicle (SUV), etc.). In the example of FIG. 1, the vehicle 100 includes a first wheel (e.g., a left front (LF) wheel) 104A and a second wheel (e.g., a right front (RF) wheel) 104B, a third wheel (e.g., a left rear (LR)

wheel) 104C, and a fourth wheel (e.g., a right rear (RR) wheel) 104D. In this example, the first and second wheels 104A, 104B are coupled to and/or associated with a front axle 110A of the vehicle 100, and the third and fourth wheels 104C, 104D are coupled to and/or associated with a rear axle 110B of the vehicle 100.

Additionally, the vehicle 100 of FIG. 1 includes example suspension systems (e.g., suspension systems) 112A, 112B, 112C, 112D operatively coupled to respective ones of the wheels 104A, 104B, 104C, 104D. For example, the vehicle 100 includes a first suspension system 112A operatively coupled to the first wheel 104A, a second suspension system 112B operatively coupled to the second wheel 104B, a third suspension system 112C operatively coupled to the third wheel 104C, and a fourth suspension system 112D operatively coupled to the fourth wheel 104D. In some examples, the suspension systems 112A, 112B, 112C, 112D enable independent suspension (e.g., independent front suspension (IFS) and/or independent rear suspension (IRS)). For example, the first and second suspension systems 112A, 112B enable the first and second wheels 104A, 104B to move independently from one another, and the third and fourth suspension systems 112C, 112D enable the third and fourth wheels 104C, 104D to move independently from one another. In some examples, the suspension systems 112A, 112B, 112C, 112D can be used with solid and/or live axle configurations. In this example, the suspension systems 112A, 112B, 112C, 112D are MacPherson strut suspension systems. In some examples, one or more different types of suspension systems can be used for one(s) of the suspension systems 112A, 112B, 112C, 112D (e.g., passive double wishbone (SLA) suspensions, leaf spring suspensions, trailing-arm suspensions, active and/or semi-active suspension systems, etc.).

In the illustrated example of FIG. 1, the vehicle 100 includes example suspension sensors (e.g., corner sensors, first accelerometers) 114A, 114B, 114C, 114D operatively coupled to respective ones of the suspension systems 112A, 112B, 112C, 112D. For example, the vehicle 100 includes a first suspension sensor 114A operatively coupled to the first suspension system 112A, a second suspension sensor 114B operatively coupled to the second suspension system 112B, a third suspension sensor 114C operatively coupled to the third suspension system 112C, and a fourth suspension sensor 114D operatively coupled to the fourth suspension system 112D. The vehicle 100 further includes an example body sensor (e.g., a vehicle body sensor) 116 fixedly coupled to a vehicle body 106 of the vehicle 100. In this example, the suspension sensors 114A, 114B, 114C, 114D and the body sensor 116 are tri-axis accelerometers that measure acceleration (e.g., an x-acceleration, a y-acceleration, and/or a z-acceleration) along three dimensions and/or axes (e.g., an x-axis, a y-axis, and/or a z-axis).

In the illustrated example of FIG. 1, the body sensor 116 measures acceleration of the body sensor 116 with respect to a body sensor coordinate system 118 positioned at (e.g., with an origin at) the body sensor 116. For example, the body sensor 116 measures a body sensor x-acceleration along a body sensor x-axis 120A of the body sensor coordinate system 118, a body sensor y-acceleration along a body sensor y-axis 120B of the body sensor coordinate system 118, and/or a body sensor z-acceleration along a body sensor z-axis 120C of the body sensor coordinate system 118. Further, the suspension sensors 114A, 114B, 114C, 114D measure acceleration of the respective suspension sensors 114A, 114B, 114C, 114D relative to respective sensor coordinate systems 122, one of which is shown in FIG. 1. For example, the sensor coordinate system 122 shown in FIG. 1 is positioned at (e.g., with an origin at) the first suspension sensor 114A, such that the first suspension sensor 114A measures a sensor x-acceleration along a sensor x-axis 124A of the sensor coordinate system 122, a sensor y-acceleration along a sensor y-axis 124B of the sensor coordinate system 122, and/or a sensor z-acceleration along a sensor z-axis 124C of the sensor coordinate system 122. While only one of the sensor coordinate systems 122 is shown in FIG. 1, additional sensor coordinate systems 122 are positioned at respective ones of the suspension sensors 114B, 114C, 114D. In some examples, the measured accelerations for particular one(s) of the sensors 114A, 114B, 114C, 114D, 116 can be described with respect to a different coordinate system (e.g., a different one of the sensor coordinate systems 122, the body sensor coordinate system 118, and/or to an example global coordinate system 126 of the vehicle 100). In this example, the global coordinate system 126 is defined by a global x-axis (e.g., a longitudinal axis) 128A, a global y-axis (e.g., a lateral axis) 128B, and a global z-axis (e.g., a vertical axis) 128C. In the example of FIG. 1, the global coordinate system 126 is a fixed coordinate system (e.g., at a fixed position and/or orientation) with the global z-axis 128C substantially parallel to a direction of gravity.

In this example, the body sensor 116 is fixedly coupled to the vehicle body 106 of the vehicle 100, such that the body sensor 116 can rotate with the vehicle body 106 relative to the global coordinate system 126. In some examples, the suspension sensors 114A, 114B, 114C, 114D are coupled to movable components (e.g., lower control arms) of the respective suspension systems 112, such that the suspension sensors 114A, 114B, 114C, 114D can move (e.g., rotate and/or translate) relative to the vehicle body 106 of the vehicle 100. In some examples, the body sensor 116 and the suspension sensors 114A, 114B, 114C, 114D are communicatively coupled to the mass estimation circuitry 102 to provide sensor data (e.g., the measured acceleration(s)) to the mass estimation circuitry 102.

In the illustrated example of FIG. 1, the mass estimation circuitry 102 estimates and/or determines example vehicle information based on the sensor data (e.g., body sensor data and/or suspension sensor data) received and/or obtained from one(s) of the sensors 114A, 114B, 114C, 114D, 116. In some examples, the vehicle information includes example mass and/or weight information corresponding to the vehicle 100. For example, the vehicle information including a vehicle mass (e.g., a total vehicle mass) of the vehicle 100, a front axle mass of the front axle 110A, a rear axle mass of the rear axle 110B, and/or wheel-end force(s) associated with respective one(s) of the wheels 104A, 104B, 104C, 104D. In this example, the mass estimation circuitry 102 is implemented at the vehicle 100. In some examples, the mass estimation circuitry 102 can be implemented remotely (e.g., at a user device, in a cloud-based environment, etc.).

In the example of FIG. 1, the mass estimation circuitry 102 is further communicatively coupled to an example user interface 125. In some examples, the user interface 125 corresponds to a display (e.g., a vehicle display, a human machine interface (HMI)) included in the vehicle 100, etc.). In some examples, the user interface 125 may be implemented at a user device (e.g., a mobile device, a computer, etc.) separate from the vehicle 100. In some examples, the user interface 125 presents and/or displays the vehicle information determined by the mass estimation circuitry 102 (e.g., the vehicle mass, the front axle mass, the rear axle mass, the wheel-end force(s), etc.). For example, the mass estimation circuitry 102 can cause the user interface 125 to present the vehicle information to a driver, a passenger, vehicle service personnel, etc. of the vehicle 100. In some examples, the user interface 125 displays warnings and/or alerts to the driver when the vehicle 100 is subjected to predetermined conditions (e.g., the vehicle weight exceeds a first threshold, the front axle mass and/or the rear axle mass exceed a second threshold, etc.). In some examples, the user interface 125 requests interaction from the driver of the vehicle 100 (e.g., pressing a button, entering a command, etc.). Additionally or alternatively, the user interface 125 can receive input from the driver of the vehicle 100 (e.g., requesting information, resetting one or more reference parameters, etc.).

Figure 2:
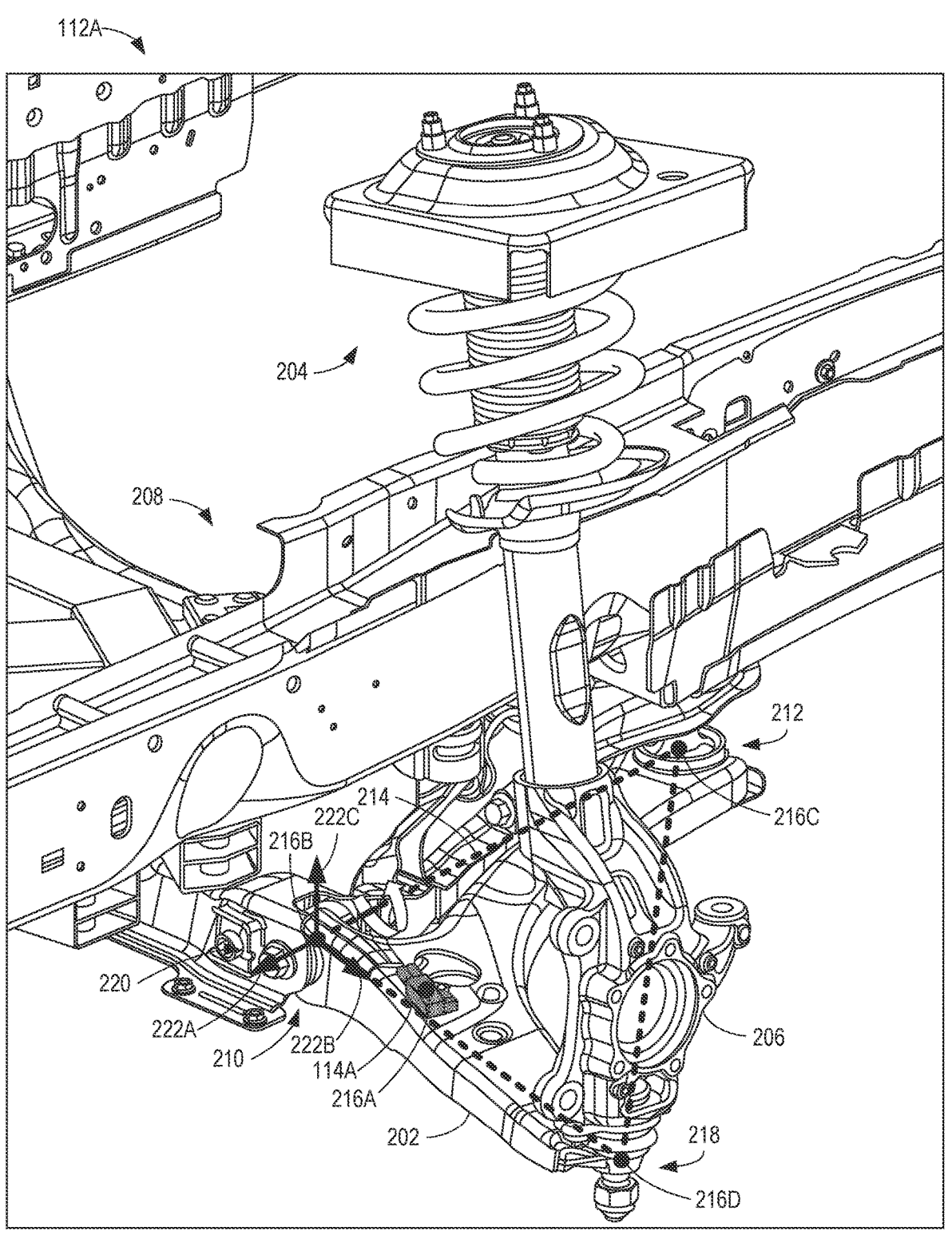
FIG. 2 is a perspective view of an example suspension system of the example vehicle of FIG. 1.

FIG. 2 is a perspective view of one of the example suspension systems 112A of FIG. 1. For example, while the illustrated example of FIG. 2 is described with respect to the first suspension system 112A associated with the first wheel 104A of FIG. 1, the description of FIG. 2 can similarly be applied to any one(s) of the second, third, and fourth suspension systems 112B, 112C, 112D of FIG. 1. In the illustrated example of FIG. 2, the first suspension system 112A includes an example control arm (e.g., a lower control arm (LCA), a first movable linkage) 202, an example strut assembly (e.g., a shock absorber) 204, and an example knuckle (e.g., a second movable linkage) 206 coupled between the control arm 202 and the strut assembly 204. In this example, the control arm 202 is coupled (e.g., rotatably and/or pivotably coupled) to a frame (e.g., a vehicle frame) 208 of the vehicle 100 at a first example bushing (e.g., a bushing A) 210 and a second example bushing (e.g., a bushing B) 212. In such examples, the control arm 202 is rotatable and/or pivotable about a first example rotational axis 214 extending between the first and second bushings 210, 212. Further, the first suspension sensor 114A is positioned on and/or coupled to the control arm 202, such that the first suspension sensor 114A can pivot and/or rotate with the control arm 202 about the first rotational axis 214. While the first suspension sensor 114A is positioned on the control arm 202 in this example, the first suspension sensor 114A can be positioned on a different component of the first suspension system 112A (e.g., on the knuckle 206, on the strut assembly 204, etc.) in some examples.

In some examples, the mass estimation circuitry 102 of FIG. 1 determines positions (e.g., locations) of example reference points (e.g., hardpoints, geometric hardpoints) 216 on the first suspension system 112A. For example, the reference points 216 can correspond to different components and/or features of the first suspension system 112A, and can include fixed reference points (e.g., points that are fixed relative to the frame 208) and/or variable reference points (e.g., points that are movable relative to the frame 208). In some examples, the mass estimation circuitry 102 determines design positions (e.g., initial positions, expected positions) of the reference points 216 relative to the global coordinate system 126 of the vehicle 100. In some examples, the design positions represent expected positions of the corresponding reference points 216 at a design state (e.g., an expected state, a first load condition) of the vehicle 100 (e.g., when the vehicle 100 is at a curb weight, immediately after assembly of the vehicle 100, etc.). In some examples, the mass estimation circuitry 102 determines the design positions of the respective reference points 216 based on an example design model (e.g., a computer aided design (CAD) model) representative of the vehicle 100. In some examples, the mass estimation circuitry 102 determines the design positions based on actual measurements taken from the vehicle 100 and/or from a test vehicle. In some examples, the mass estimation circuitry 102 determine current positions (e.g., actual positions, measured positions) of one(s) of the reference points 216 based on the design positions of the reference points 216 and/or based on sensor data from the first suspension sensor 114A. In some examples, the current positions represent actual positions of the reference points 216 when the vehicle 100 is at a current state (e.g., a second load condition, the vehicle 100 is loaded beyond a curb weight of the vehicle 100, etc.). In some examples, the mass estimation circuitry 102 compares the design positions to the current positions of the reference points 216 to determine vehicle information including wheel-end force(s), a front axle mass, a rear axle mass, and/or vehicle mass of the vehicle 100.

In the illustrated example of FIG. 2, four of the reference points 216 are shown. For example, a first example reference point 216A corresponds to the first suspension sensor 114A, a second example reference point (e.g., a bushing A point) 216B corresponds to the first bushing 210, and a third example reference point (e.g., a bushing B point) 216C corresponds to the second bushing 212. Further, a fourth example reference point 216D corresponds to a ball joint (e.g., a lower ball joint) 218 at which the knuckle 206 is coupled to the control arm 202. While four of the reference points 216 are shown in FIG. 2, a different number of the reference points 216 may be used instead. For example, one or more additional reference points 216 (e.g., more than four) may be identified and/or utilized by the mass estimation circuitry 102. Additionally or alternatively, different components and/or features of the first suspension system 112A can be selected for one(s) of the reference points 216 instead.

In this example, the positions (e.g., the current positions and/or the design positions) of the corresponding reference points 216 are described with respect to the global coordinate system 126 of the vehicle 100 of FIG. 1. Additionally or alternatively, the positions of the reference points 216 can be described with respect to a local coordinate system 220 of the first suspension system 112A, where the local coordinate system 220 of FIG. 2 is positioned at the second reference point 216B and is defined by a local x-axis 222A, a local y-axis 222B, and a local z-axis 222C. In this example, the local coordinate system 220 is positioned at (e.g., has an origin at) the second reference point 216B. In some examples, the local coordinate system 220 can be positioned at a different location of the first suspension system 112A (e.g., the third reference point 216C, a point on the frame 208, etc.). In some examples, one or more additional local coordinate systems can be defined at different locations of the first suspension system 112A. In some examples, the positions of the reference points 216 can be transformed between two or more coordinate systems (e.g., the local coordinate system 220, the global coordinate system 126, the body sensor coordinate system 118, and/or one(s) of the sensor coordinate systems 122) by the mass estimation circuitry 102 of FIG. 1.

Figure 3:
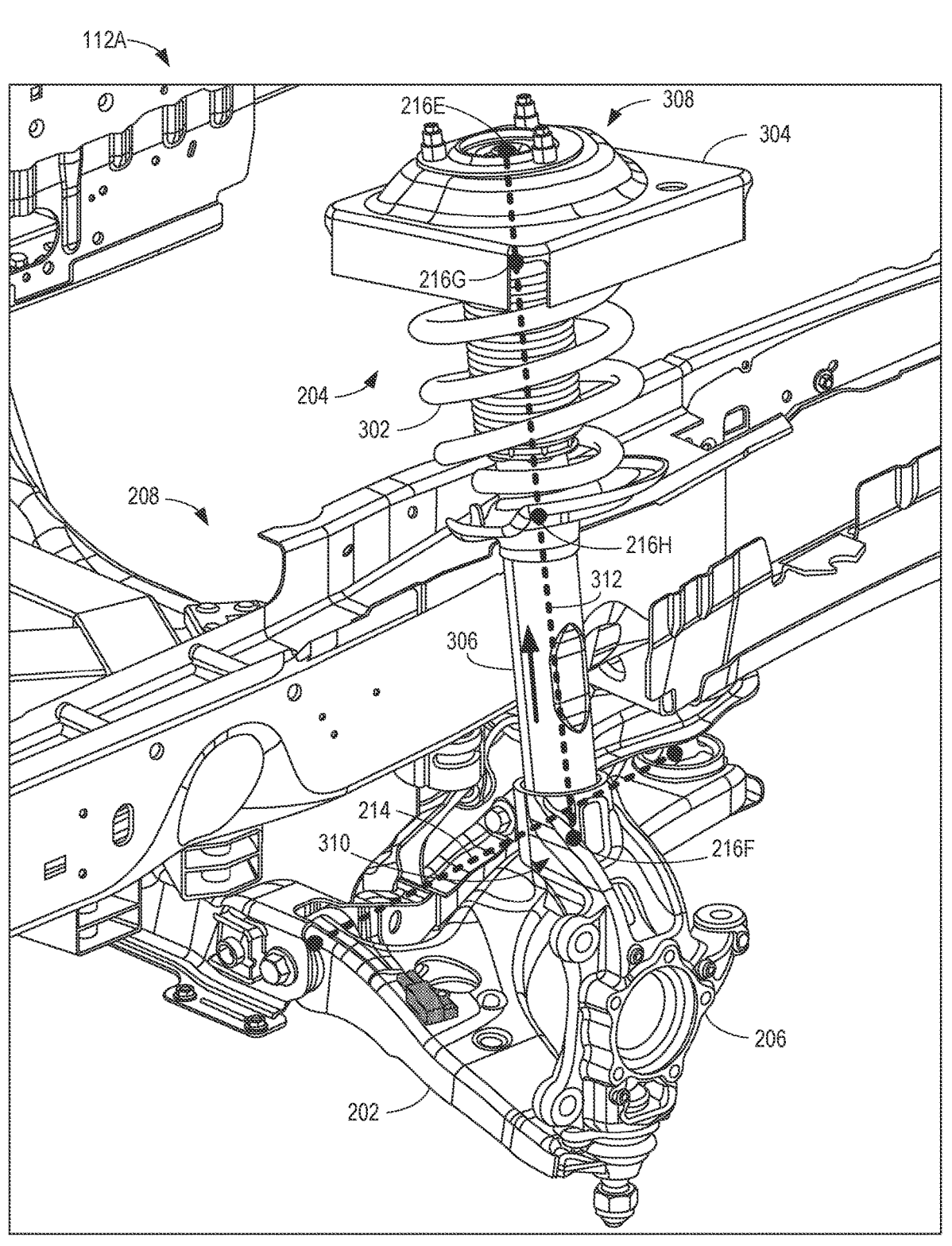
FIG. 3 is a perspective view of the example suspension system of FIGS. 1 and/or 2 including example reference points positioned on an example strut assembly.

FIG. 3 is a perspective view of the first suspension system 112A of FIGS. 1 and/or 2 including additional example reference points 216E, 216F, 216G, 216H positioned along the example strut assembly 204. In the illustrated example of FIG. 3, the strut assembly 204 includes an example spring (e.g., a coil spring) 302 operatively coupled between an example upper mount 304 and an example strut tube 306. In some examples, a fifth example reference point (e.g., an upper strut point) 216E is located at the upper mount 304 (e.g., at an upper end 308 of the strut assembly 204), and a sixth example reference point (e.g., a lower strut point) 216F is located at a lower strut joint (e.g., a lower end) 310 of the strut assembly 204 at which the strut assembly 204 is coupled to the knuckle 206. Further, a seventh example reference point (e.g., an upper spring point) 216G is located at one end of the spring 302 (e.g., closer to the upper end 308 of the strut assembly 204) and an eighth example reference point (e.g., a lower spring point) 216H is located at an opposite end of the spring 302 (e.g., closer to the lower strut joint 310 of the strut assembly 204).

In some examples, the fifth reference point 216E is a fixed point (e.g., fixed with respect to the frame 208), and the sixth, seventh, and eighth reference points 216F, 216G, 216H are variable points (e.g., movable with respect to the frame 208). For example, when the control arm 202 pivots with respect to the first rotational axis 214 (e.g., as a result of a load being applied on the vehicle 100, as a result of the first wheel 104A of FIG. 1 encountering a pothole and/or a protrusion in the road, etc.), the strut assembly 204 can translate along an example longitudinal axis 312 of the strut assembly 204 to cause compression and/or extension of the spring 302.

Figure 4:
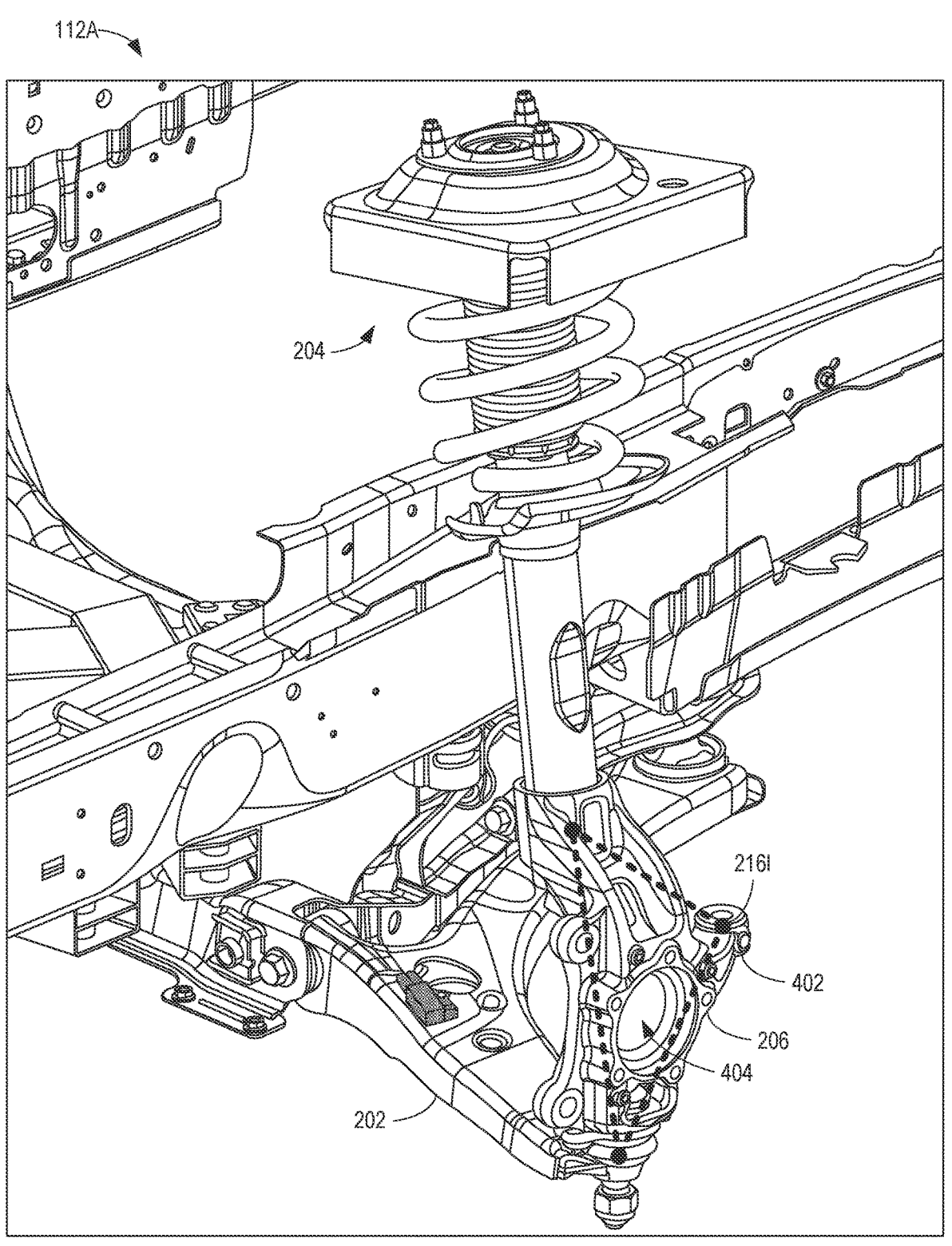
FIG. 4 is a perspective view of the example suspension system of FIGS. 1, 2, and/or 3 including an additional example reference point positioned on a knuckle.

FIG. 4 is a perspective view of the first suspension system 112A of FIGS. 1, 2, and/or 3 including an additional example reference point 216I positioned on the knuckle 206. For example, a ninth example reference point 216I is located at an example steering link joint 402 of the knuckle 206. In some examples, a steering link (not shown) can be operatively coupled to the steering link joint 402 to enable steering of the first wheel 104A of FIG. 1. Further, the first wheel 104A can be coupled to the knuckle 206 via a shaft (not shown) extending through an opening 404 of the knuckle 206, such that the first wheel 104A is substantially coaxial with the opening 404. In some examples, the steering link coupled to the steering link joint 402 can be used to rotate the knuckle 206 and, thus, the first wheel 104A to adjust a wheel orientation (e.g., a toe angle, a camber angle, and/or a caster angle) of the first wheel 104A. In some examples, a position and/or orientation of the knuckle 206 and, thus, the first wheel 104A is based on rotation of the control arm 202 (e.g., about the first rotational axis 214 of FIGS. 2 and/or 3) and/or based on translation of the strut assembly 204 (e.g., along the longitudinal axis 312 of FIG. 3).

In some examples, one or more additional reference points 216 can be identified and/or utilized by the mass estimation circuitry 102 of FIG. 1. For example, additional one(s) of the reference points 216 can correspond to a steering gear joint of the vehicle 100, a wheel center point of the first wheel 104A of FIG. 1, an upper jounce bumper point and a lower jounce bumper point of an example jounce bumper (not shown) included in the strut assembly 204, and/or an upper rebound bumper point and a lower rebound bumper point of an example rebound bumper (not shown) included in the strut assembly 204.

Figure 5:
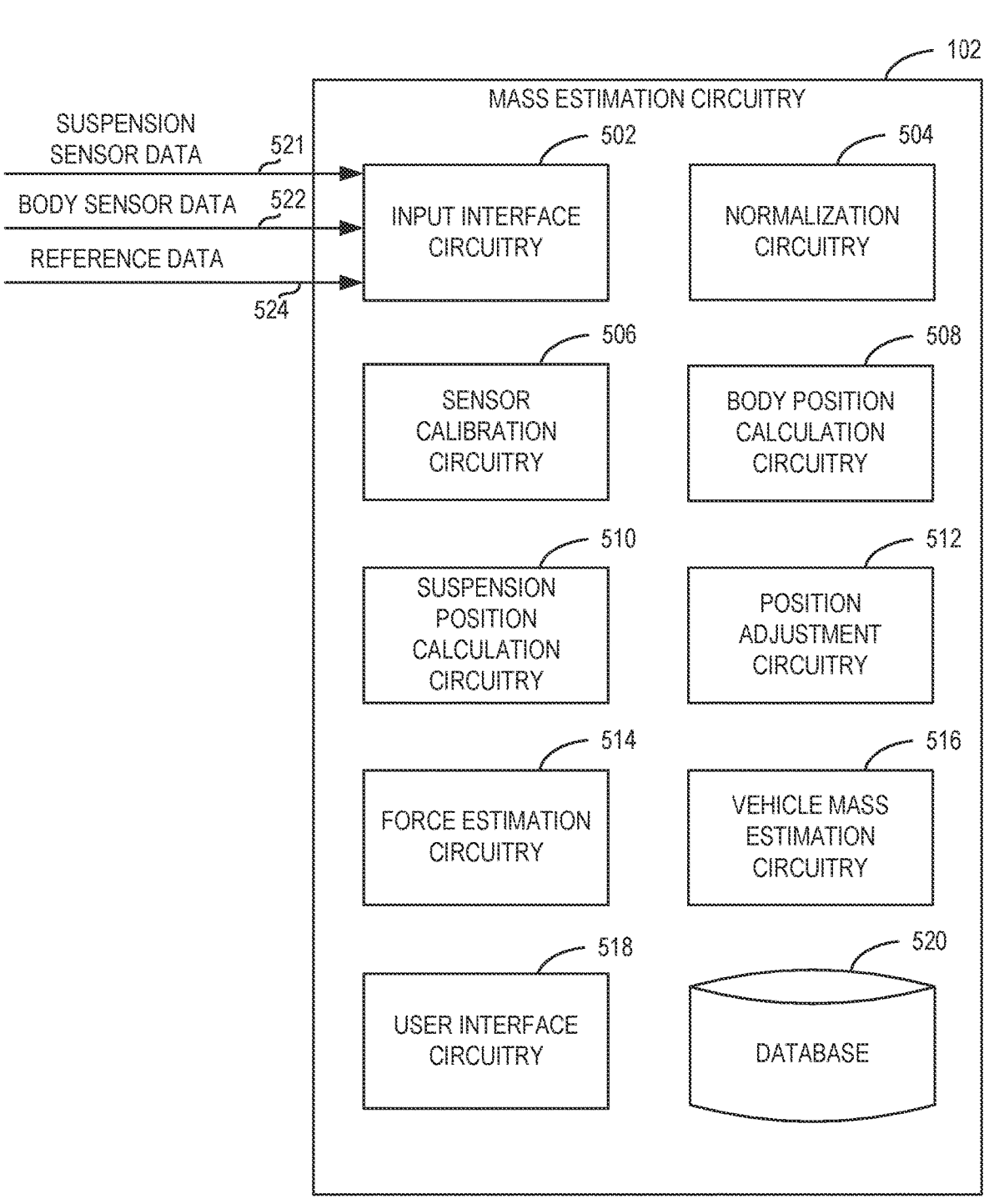
FIG. 5 is a block diagram of an example implementation of the example mass estimation circuitry of FIG. 1.

FIG. 5 is a block diagram of an example implementation of the mass estimation circuitry 102 of FIG. 1. The mass estimation circuitry 102 of FIG. 5 may be instantiated (e.g., creating an instance of, bring into being for any length of time, materialize, implement, etc.) by programmable circuitry such as a Central Processor Unit (CPU) executing first instructions. Additionally or alternatively, the mass estimation circuitry 102 of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

In the illustrated example of FIG. 5, the mass estimation circuitry 102 includes example input interface circuitry 502, example normalization circuitry 504, example sensor calibration circuitry 506, example body position calculation circuitry 508, example suspension position calculation circuitry 510, example position adjustment circuitry 512, example force estimation circuitry 514, example vehicle mass estimation circuitry 516, example user interface circuitry 518, and/or an example database 520.

The example input interface circuitry 502 of FIG. 5 obtains, accesses, and/or receives example input data utilized by the mass estimation circuitry 102 to determine example vehicle information (e.g., wheel-end force(s), front axle mass, rear axle mass, vehicle mass, etc.) associated with the vehicle 100 of FIG. 1. For example, the input interface circuitry 502 is communicatively coupled to the example body sensor 116 and/or one(s) of the example suspension sensors 114A, 114B, 114C, 114D of FIG. 1 to obtain input data therefrom. In some examples, the input interface circuitry 502 obtains example suspension sensor data 521 from respective one(s) of the suspension sensors 114A, 114B, 114C, 114D. The suspension sensor data 521 can include measurement values (e.g., in meters per second per second $(m/s^2)$) representative of the acceleration of the respective suspension sensors 114A, 114B, 114C, 114D in three directions (e.g., along the sensor x-axis 124A, the sensor y-axis 124B, and the sensor z-axis 124C of the respective sensor coordinate systems 122 of FIG. 1). In some examples, the input interface circuitry 502 obtains example body sensor data 522 from the body sensor 116. In some examples, the body sensor data 522 includes measurement values (e.g., in $m/s^2$) representative of acceleration of the body sensor 116 along the body sensor x-axis 120A, the body sensor y-axis 120B, and the body sensor z-axis 120C of the body sensor coordinate system 118 of FIG. 1.

In some examples, the input interface circuitry 502 obtains example reference data 524 associated with the vehicle 100. In some examples, the reference data 524 includes example design positions (e.g., initial positions) of respective one(s) of the reference points 216 of FIGS. 2, 3, and/or 4. For example, FIG. 6A illustrates a first example table 600 representative of example design positions that may be included in the example reference data 524. In the illustrated example FIG. 6A, a first example column 602 of the first table 600 includes first labels (e.g., descriptions) 604A representative of respective reference points 216 associated with one of the example suspension systems 112A, 112B, 112C, 112D (e.g., the first suspension system 112A). Additionally, the first column 602 includes second labels 604B representative of the sensor x-axis 124A, the sensor y-axis 124B, and the sensor z-axis 124C of the first suspension sensor 114A associated with the first suspension system 112A. In the example of FIG. 6A, a second example column 606 indicates example notations used to represent the design positions of corresponding one(s) of the reference points 216 and/or the sensor axes 124A, 124B, 124C. In some examples, the design positions for one(s) of the reference points 216 and/or one(s) of the sensor axes 124A, 124B, 124C are represented with respect to the global coordinate system 126 of the vehicle 100. For example, the design positions of the reference points 216 in FIG. 6A are represented using grid coordinate positions along the global x-axis 128A, the global y-axis 128B, and the global z-axis 128C, respectively, of the global coordinate system 126. Similarly, the design positions of the sensor axes 124A, 124B, 124C are represented as vectors in the global coordinate system 126. In some examples, the design positions can be represented in (and/or transformed into) the local coordinate system 220 of the first suspension system 112A, the sensor coordinate system 122 of the first suspension sensor 114A, the body sensor coordinate system 118 of the body sensor 116, etc. Further, while the first table 600 of FIG. 6A represents ones of the reference points 216 corresponding to the first suspension system 112A, the reference points 216 in FIG. 6A can correspond to any of the second suspension system 112B, the third suspension system 112C, and/or the fourth suspension system 112D in some examples.

Returning to FIG. 5, the reference data 524 can further include component properties associated with one or more components of corresponding one(s) of the suspension system(s) 112A, 112B, 112C, 112D. For example, the component properties can include a strut spring rate of the strut assembly 204 (e.g., in Newtons per millimeter (N/mm)), a coil spring free length of the spring 302 (e.g., in millimeters (mm)), bushing spring rate(s) (e.g., in Newtons per degree (N/Deg)) of the first bushing 210 and/or the second bushing 212, windup angle(s) (e.g., in degrees) of the first bushing 210 and/or the second bushing 212, bumper spring rate(s) (e.g., in N/mm) of the jounce bumper and/or the rebound bumper of the suspension system 114, a control arm length (e.g., in mm) of the control arm 202, etc. In some examples, the input interface circuitry 502 obtains the reference data 524 (and/or a portion thereof) from user input (e.g., via the user interface 125 of FIG. 1). In some examples, the input interface circuitry 502 obtains the reference data 524 (and/or a portion thereof) from a design model (e.g., a computer aided design (CAD) model) of the vehicle 100. In some examples, the input interface circuitry 502 provides the suspension sensor data 521, the body sensor data 522, and/or the reference data 524 to the database 520 for storage. In some examples, the input interface circuitry 502 is instantiated by programmable circuitry executing input interface circuitry instructions and/or configured to perform operations such as those represented by the flowchart(s) of FIGS. 9, 10, 11, and/or 12.

The example database 520 of FIG. 5 stores data utilized and/or determined by the mass estimation circuitry 102. For example, the database 520 can store the suspension sensor data 521, the body sensor data 522, and/or the reference data 524 accessed and/or obtained by the input interface circuitry 502. Additionally or alternatively, the database 520 can store output values (e.g., wheel-end force(s), a front axle mass, a rear axle mass, a vehicle mass, etc.) determined by the mass estimation circuitry 102. The example database 520 of FIG. 5 is implemented by any memory, storage device and/or storage disc for storing data such as, for example, flash memory, magnetic media, optical media, solid state memory, hard drive(s), thumb drive(s), etc. Furthermore, the data stored in the database 520 may be in any data format such as, for example, binary data, comma delimited data, tab delimited data, structured query language (SQL) structures, etc. While, in the illustrated example, the database 520 is illustrated as a single device, the example database 520 and/or any other data storage devices described herein may be implemented by any number and/or types of memories and/or software.

The example normalization circuitry 504 of FIG. 5 normalizes (e.g., with respect to gravity) acceleration measurements (e.g., the x-acceleration, the y-acceleration, and/or the z-acceleration values) included in the suspension sensor data 521 and/or the body sensor data 522. For example, as a result of manufacturing and assembly tolerances, acceleration measurements output by the body sensor 116 and/or one(s) of the suspension sensors 114A, 114B, 114C, 114D may not sum to an expected value (e.g., 9.81 m/s²). To normalize the acceleration measurements with respect to gravity, the normalization circuitry 504 calculates, for one(s) of the sensors (e.g., the body sensor 116 and/or one(s) of the suspension sensors 114A, 114B, 114C, 114D), an example gain to be applied to the acceleration measurements. In some examples, the normalization circuitry 504 applies the gain to the acceleration measurements to scale the acceleration measurements at given measurement increments. In some examples, the gain is approximately constant (e.g., does not vary) for a given one of the sensors 116, 114A, 114B, 114C, 114D at a given temperature across varying pitch and/or roll of the given sensor. In some examples, when the normalization circuitry 504 detects significant deviation in the calculated gain for a given sensor, the normalization circuitry 504 can cause the user interface circuitry 518 to present, via the user interface 125 of FIG. 1, a warning indicating that the acceleration measurements may be subject to error as a result of a voltage supply issue and/or an uncompensated temperature change associated with the sensor. In some examples, the calculated gain can be recalculated based on quantified usage or time to normalize for factors (e.g., input voltage, etc.) that result in a measurable drift over the lifetime of the sensor.

In some examples, during manufacture of the sensor(s) 116, 114A, 114B, 114C, 114D, individual gains (e.g., sensor axis gains and/or offset errors) can be measured and recorded for respective sensor(s) 116, 114A, 114B, 114C, 114D. In some such examples, the normalization circuitry 504 applies the individual gains to the respective acceleration measurements of the respective sensor(s) (e.g., instead of applying a common gain across the acceleration measurements). In some examples, the normalization circuitry 504 is instantiated by programmable circuitry executing normalization circuitry instructions and/or configured to perform operations such as those represented by the flowchart(s) of FIGS. 9, 10, 11, and/or 12.

The example sensor calibration circuitry 506 of FIG. 5 calibrates the sensor measurements (e.g., acceleration measurements) for respective one(s) of the sensors (e.g., the body sensor 116 and/or one(s) of the suspension sensors 114A, 114B, 114C, 114D) based on actual positions (e.g., mounting positions) of the respective sensor(s) on the vehicle 100. For example, as a result of manufacturing and assembly tolerances, when the sensor(s) 116, 114A, 114B, 114C, 114D are installed on the vehicle 100, the actual positions of the respective sensor(s) 116, 114A, 114B, 114C, 114D may vary relative to the expected positions (e.g., the design positions) of the respective sensor(s) 116, 114A, 114B, 114C, 114D determined based on a CAD model of the vehicle 100. In some examples, the gain and/or offset values of the respective sensor(s) 116, 114A, 114B, 114C, 114D may differ as a result of variation between the actual and expected positions of the sensor(s) 116, 114A, 114B, 114C, 114D.

In some examples, to calibrate a respective one of the sensors 116, 114A, 114B, 114C, 114D, the sensor calibration circuitry 506 accesses and/or obtains a baseline sensor measurement from the respective sensor 116, 114A, 114B, 114C, 114D, along with a baseline force measurement (e.g., measured wheel-end force) from a force sensor installed on the vehicle 100. In some examples, the sensor calibration circuitry 506 calculates (e.g., by the body position calculation circuitry 508, the suspension position calculation circuitry 510, the position adjustment circuitry 512, and/or the force estimation circuitry 514 as described further below) a wheel-end force based on the baseline sensor measurement. Further, the sensor calibration circuitry 506 determines an offset correction value for the respective sensor 116, 114A, 114B, 114C, 114D based on a comparison between the calculated wheel-end force and the baseline wheel-end force. Additionally or alternatively, the sensor calibration circuitry 506 can determine a gain correction value for the respective sensor 116, 114A, 114B, 114C, 114D based on multiple baseline force measurements and multiple corresponding baseline sensor measurements from the respective sensor 116, 114A, 114B, 114C, 114D. In some examples, the sensor calibration circuitry 506 calibrates (e.g . . . , adjusts) the sensor measurements from the body sensor 116 and/or the suspension sensor(s) 114A, 114B, 114C, 114D based on the corresponding offset correction value(s) and/or the gain correction value(s) determined for one(s) of the sensors 116, 114A, 114B, 114C, 114D.

In some examples, the sensor calibration circuitry 506 calibrates and/or adjusts the sensor measurements from one(s) of the suspension sensors 114A, 114B, 114C, 114D with respect to dynamic influence (e.g., hysteresis). As used herein, hysteresis refers to phenomenon by which a measurement varies from the input value by different degrees based on whether the input value is increasing or decreasing in magnitude. In some examples, the sensor calibration circuitry 506 performs hysteresis calibration to remove and/or reduce hysteresis error in the sensor measurements. For example, the sensor calibration circuitry 506 can calibrate the suspension sensors 114A, 114B, 114C, 114D based on first sensor measurements collected by the respective suspension sensors 114A, 114B, 114C, 114D when increasing loads are applied on the respective suspension systems 112A, 112B, 112C, 112D, and second sensor measurements collected by the respective suspension sensors 114A, 114B, 114C, 114D when decreasing loads are applied on the respective suspension systems 112A, 112B, 112C, 112D. In such examples, the sensor calibration circuitry 506 determines hysteresis calibration factors for respective ones of the suspension sensors 114A, 114B, 114C, 114D based on differences between the first sensor measurements and the corresponding second sensor measurements collected by the suspension sensors 114A, 114B, 114C, 114D. In some such examples, the sensor calibration circuitry 506 applies the hysteresis calibration factors to sensor measurements from the corresponding suspension sensors 114A, 114B, 114C, 114D to remove and/or reduce hysteresis error in the sensor measurements. In some examples, the sensor calibration circuitry 506 is instantiated by programmable circuitry executing sensor calibration circuitry instructions and/or configured to perform operations such as those represented by the flowchart(s) of FIGS. 9, 10, 11, and/or 12.

The example body position calculation circuitry 508 calculates and/or determines, based on the body sensor data 522, an example body position (e.g., a vehicle body position) of the vehicle body 106 of FIG. 1. For example, the body position calculation circuitry 508 executes, based on the body sensor data 522, an example vehicle body model to determine an orientation of the vehicle body 106 relative to a neutral configuration of the vehicle 100. In some examples, the neutral configuration corresponds to the vehicle 100 being positioned on a substantially flat (e.g., not tiled) surface, such that an expected acceleration measurement from the body sensor 116 at the design position is approximately (0, 0, −9.81 meters per second per second $(m/s^2)$). Stated differently, the vehicle body 106 accelerates 0 m/s² along the global x-axis 128A, 0 m/s² along the global y-axis 128B, and −9.81 m/s² along the global z-axis 128C when the vehicle 100 is at the neutral configuration.

In some examples, because the body sensor 116 is fixedly coupled to and/or is rotatable with the vehicle body 106, the body position of the vehicle body 106 relative to the global coordinate system 126 of FIG. 1 can be approximated by a position of the body coordinate system 118 relative to the global coordinate system 126. For example, the body position calculation circuitry 508 can determine the position of the body coordinate system 118 and, thus, the body position of the vehicle body 106 based on sensor measurements from the body sensor 116. In some examples, the body position calculation circuitry 508 accesses the normalized and/or calibrated sensor measurements (e.g., from the normalization circuitry 504 and/or the sensor calibration circuitry 506 of FIG. 5) determined for the body sensor 116. In some such examples, the body position calculation circuitry 508 determines an example body coordinate transform (e.g., a neutral axis transform) based on the sensor measurements, where the body coordinate transform relates the body coordinate system 118 to the global coordinate system 126 of the vehicle 100.

In some examples, the body position calculation circuitry 508 calculates the body coordinate transform by determining, based on the body sensor measurements, angular rotation of the body sensor 116 and, thus, the vehicle body 106 relative to the neutral configuration of the vehicle 100. For example, the body coordinate transform represents an angular rotation about the global x-axis 128A and/or the global y-axis 128B of FIG. 1 to align the body z-axis 120C and the global z-axis 128C of FIG. 1. In some examples, the body position calculation circuitry 508 calculates the body coordinate transform based on a difference between an expected acceleration of the body sensor 116 in the neutral configuration (e.g., (0, 0, −9.81 m/s²)) and the measured acceleration (e.g., an actual acceleration) of the body sensor 116.

In some examples, the body position calculation circuitry 508 utilizes the body coordinate transform to transform and/or adjust design position(s) of one(s) of the reference points 216 (e.g., corresponding to the first labels 604A of FIG. 6A) and/or the sensor axes 124A, 124B, 124C (e.g., corresponding to the second labels 604B of FIG. 6A). For example, the body position calculation circuitry 508 determines adjusted design positions of the reference points 216 and/or the sensor axes 124A, 124B, 124C by mapping, using the body coordinate transform, the design positions from the global coordinate system 126 to the body coordinate system 118. In such examples, the adjusted design positions can be used to compensate for any initial pitch and/or roll of the vehicle body 106 in the design position. In some examples, the body position calculation circuitry 508 provides the adjusted design positions of the reference points 216 and/or the sensor axes 124A, 124B, 124C (e.g., the design positions relative to the body coordinate system 118) to the suspension position calculation circuitry 510 (and/or to the database 520 to be accessed by the suspension position calculation circuitry 510).

Additionally, in some examples, the body position calculation circuitry 508 calculates and/or determines first example local gravity vectors (e.g., design gravity vectors) corresponding to respective ones of the suspension sensors 114A, 114B, 114C, 114D. In some examples, the first local gravity vectors represent a direction of gravity relative to the sensor coordinate systems 122 of the respective suspension sensors 114A, 114B, 114C, 114D in the design position. In some examples, the body position calculation circuitry 508 determines the first local gravity vectors based on the adjusted design positions of the sensor axes 124A, 124B, 124C of the respective suspension sensors 114A, 114B, 114C, 114D. In some examples, the body position calculation circuitry 508 is instantiated by programmable circuitry executing body position calculation circuitry instructions and/or configured to perform operations such as those represented by the flowchart(s) of FIGS. 9, 10, 11, and/or 12.

The example suspension position calculation circuitry 510 of FIG. 5 calculates and/or determines one or more example output parameters based on the normalized and/or calibrated suspension sensor data 521 and/or based on the design positions (e.g., the adjusted design positions) determined for one(s) of the reference points 216. In some examples, the output parameters include current positions of (and/or relative positions between) one(s) of the reference points 216 on the vehicle 100. Turning to FIG. 6B, a second example table 610 is shown indicating one(s) of the example output parameter(s) that can be determined by the suspension position calculation circuitry 510. In the illustrated example of FIG. 6B, a third example column 612 of the second table 610 includes third labels (e.g., descriptions) 614A representative of respective ones of the reference points 216 corresponding to one of the suspension systems 112A, 112B, 112C, 112D (e.g., the first suspension system 112A). Additionally, the third column 612 includes fourth labels 614B representative of example component properties determined for the first suspension system 112A. While the second table 610 of FIG. 6B is described with respect to the first suspension system 112A, the description of FIG. 6B can similarly be applied to any of the second suspension system 112B, the third suspension system 112C, and/or the fourth suspension system 112D.

In the illustrated example of FIG. 6B, the component properties include an example control arm angle of the control arm 202, an example strut length of the example strut assembly 204, an example coil spring length of the example spring 302, an example camber angle of the first wheel 104A, and/or an example caster angle of the first wheel 104A. In the example of FIG. 6B, a fourth example column 616 represents example notations and/or measurement units used for one(s) of the reference points 216 and/or the component properties. For example, the notations and/or measurement units can be used to represent current (e.g., calculated) positions of the corresponding reference points 216 and/or current (e.g., calculated) values for the respective component properties, as determined by the suspension position calculation circuitry 510 of FIG. 5.

Returning to FIG. 5, to determine the current positions and/or values associated with respective ones of the suspension systems 112A, 112B, 112C, 112D, the suspension position calculation circuitry 510 determines and/or calculates second example local gravity vectors (e.g., current gravity vectors) corresponding to the respective ones of the suspension systems 112A, 112B, 112C, 112D. In some examples, the second local gravity vectors represent a direction of gravity (e.g., relative to the sensor coordinate systems 220 of the respective suspension systems 112A, 112B, 112C, 112D) when the suspension systems 112A, 112B, 112C, 112D are in the current position. In some examples, the suspension position calculation circuitry 510 determines the second local gravity vectors in the current position based on the acceleration measurements from the respective suspension sensors 114A, 114B, 114C, 114D.

In some examples, the suspension position calculation circuitry 510 can determine and/or estimate current position(s) of the respective suspension sensor(s) 114A, 114B, 114C, 114D based on differences between the first local gravity vectors in the design position and the corresponding second local gravity vectors in the current position as determined for the respective suspension sensor(s) 114A, 114B, 114C, 114D. For example, while the local gravity vectors in the sensor coordinate systems 122 may vary based on a change in position(s) of the corresponding suspension sensor(s) 114A, 114B, 114C, 114D, the gravity vectors in the global coordinate system 128 are constant (e.g., irrespective of any change in position(s) of the suspension sensor(s) 114A, 114B, 114C, 114D). As a result, the suspension position calculation circuitry 510 can estimate changes in position of the respective suspension sensor(s) 114A, 114B, 114C, 114D based on changes in angular position of the local gravity vectors in the respective sensor coordinate systems 122.

For example, for a corresponding one of the suspension sensors 114A, 114B, 114C, 114D, the suspension position calculation circuitry 510 calculates a change (e.g., an angular difference) between the first local gravity vector in the design position and the first local gravity vector in the current position, where the local gravity vector(s) are represented in the sensor coordinate system 122 of the corresponding one of the suspension sensors 114A, 114B, 114C, 114D. In some examples, based on the angular difference, the suspension position calculation circuitry 510 can determine the current position of the corresponding one of the suspension sensors 114A, 114B, 114C, 114D (e.g., relative to the global coordinate system 126 of the vehicle 100).

An example process for calculating a current position of the first suspension sensor 114A is described below. However, the process can similarly be performed with respect to remaining one(s) of the suspension sensors 114B, 114C, 114D the calculate the current position(s) thereof. In this example, for the first suspension sensor 114A, the suspension position calculation circuitry 510 calculates the current position based on example input data including the design position of the first suspension sensor 114A in the global coordinate system 126 (e.g., represented by a coordinate point [x, y, z]), the design position of the second reference point 216B of the first bushing 210 in the global coordinate system 126 (e.g., represented by coordinate point [a, b, c]), an example unit vector from the second reference point 216B of the first bushing 210 to the third reference point 216C of the second bushing 212 (e.g., represented by a vector <u, v, w>), the first local gravity vector of the first suspension sensor 114A in the design position (e.g., represented by a vector L), and the second local gravity vector of the first suspension sensor 114A in the current position (e.g., represented by a vector M).

In some examples, based on example Equation 1 below, the suspension position calculation circuitry 510 determines an example angular difference (e.g., θ) between the first local gravity vector in the design position (e.g., A) and the second local gravity vector in the current position (e.g., B) based on a matrix cross product of A and B (e.g., N).

$$\theta = a\tan2((A_x * B_y * N_z) + (A_z * B_x * N_y) + (A_y * B_z * N_x) - \quad \text{(Equation 1)}$$
$$(A_z * B_y * N_x) - (A_x * B_z * N_y) - (A_y * B_x * N_z), (A \cdot B))$$

Further, based on the input data and the calculated angular difference (e.g., θ), the suspension position calculation circuitry 510 determines an example translation matrix (e.g., T), a first example rotation matrix corresponding to the global x-axis 128A (e.g., $R_x$), a second example rotation matrix corresponding to the global y-axis 128B (e.g., $R_y$), and a third example rotation matrix corresponding to the global z-axis 128C (e.g., $R_z$). For example, based on example Equation 2 below, the suspension position calculation circuitry 510 determines the translation matrix (e.g., T) based on the design position of the first bushing 210 (e.g., [a, b, c]).

$$T = \begin{bmatrix} 1 & 0 & 0 & -a \\ 0 & 1 & 0 & -b \\ 0 & 0 & 1 & -c \\ 0 & 0 & 0 & 1 \end{bmatrix} \quad \text{(Equation 2)}$$

In some examples, based on example Equation 3 below, the suspension position calculation circuitry 510 determines the first rotation matrix (e.g., $R_x$) based on the unit vector from the first bushing 210 to the second bushing 212 (e.g., <u, v, w>).

$$R_x = \begin{bmatrix} 1 & 0 & 0 & 0 \\ 0 & \dfrac{w}{\sqrt{v^2 + w^2}} & -\dfrac{w}{\sqrt{v^2 + w^2}} & 0 \\ 0 & \dfrac{w}{\sqrt{v^2 + w^2}} & \dfrac{w}{\sqrt{v^2 + w^2}} & 0 \\ 0 & 0 & 0 & 1 \end{bmatrix} \quad \text{(Equation 3)}$$

In some examples, based on example Equation 4 below, the suspension position calculation circuitry 510 determines the second rotation matrix (e.g., $R_y$) based on the unit vector from the first bushing 210 to the second bushing 212 (e.g., <u, v, w>).

$$R_y = \begin{bmatrix} \sqrt{v^2 + w^2} & 0 & -u & 0 \\ 0 & 1 & 0 & 0 \\ u & 0 & \sqrt{v^2 + w^2} & 0 \\ 0 & 0 & 0 & 1 \end{bmatrix} \quad \text{(Equation 4)}$$

In some examples, based on example Equation 5 below, the suspension position calculation circuitry 510 determines the third rotation matrix (e.g., $R_z$) based on the angular difference (e.g., θ) between the design local gravity vector (e.g., L) and the local current gravity vector (e.g., M).

$$R_z = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \quad \text{(Equation 5)}$$

In some examples, the suspension position calculation circuitry 510 determines the current position of the first suspension sensor 114A based on the design position of the first suspension sensor 114A, the translation matrix (e.g., T), and the rotation matrices (e.g., $R_x$, $R_y$, and $R_z$). For example, the suspension position calculation circuitry 510 determines the current position of the first suspension sensor 114A based on example Equation 6 below.

$$\begin{bmatrix} x' \\ y' \\ z' \\ 1 \end{bmatrix} = [T]^{-1}[R_x]^{-1}[R_y]^{-1}[R_z][R_y][R_x][T] \begin{bmatrix} x \\ y \\ z \\ 1 \end{bmatrix} \quad \text{(Equation 6)}$$

In some examples, the current position of the first suspension sensor(s) 114A is represented using grid coordinates (e.g., (x', y', z')) with respect to the global coordinate system 126 of FIG. 1. For example, the current position of the first suspension sensor 114A is represented by an x-axis coordinate (e.g., x') along the global x-axis 128A, a y-axis coordinate (e.g., y') along the global y-axis 128B, and a z-axis coordinate (e.g., z') along the global z-axis 128C of FIG. 1. In some examples, the suspension position calculation circuitry 510 can transform the grid coordinates into one or more different local coordinate systems.

For example, the suspension position calculation circuitry 510 calculates one or more example coordinate transforms for transforming position data (e.g., the current position(s) of the respective suspension sensor(s) 114A, 114B, 114C, 114D) into one or more local coordinate systems defined at respective one(s) of the suspension systems 112A, 112B, 112C, 112D. In some examples, the suspension position calculation circuitry 510 determines the coordinate transforms to and/or between ones of the local coordinate systems, where the local coordinate systems include a first example local coordinate system (e.g., defined by the second reference point 216B of the first bushing 210, the third reference point 216C of the second bushing 212, and the fourth reference point 216D of the lower ball joint 218 in the design position), a second example local coordinate system (e.g., defined by the second reference point 216B of the first bushing 210, the third reference point 216C of the second bushing 212, and the fourth reference point 216D of the lower ball joint 218 in the current position), a third example coordinate system (e.g., defined by the second reference point 216B of the first bushing 210, the third reference point 216C of the second bushing 212, and the first reference point 216A of the respective one of the suspension sensors 114A, 114B, 114C, 114D in the design position), a fourth example coordinate system (e.g., defined by the second reference point 216B of the first bushing 210, the third reference point 216C of the second bushing 212, and the first reference point 216A of the respective one of the suspension sensors 114A, 114B, 114C, 114D in the current position), a fifth example coordinate system (e.g., defined by the fourth reference point 216D of the lower ball joint 218 in the design position, the ninth reference point 216I of the steering link joint 402 in the design position, and the sixth reference point 216F of the lower strut joint 310 in the design position), a sixth example coordinate system (e.g., defined by the fourth reference point 216D of the lower ball joint 218 in the current position, the ninth reference point 216I of the steering link joint 402 in the current position, and the sixth reference point 216F of the lower strut joint 310 in the current position), a seventh example coordinate system (e.g., defined by the second reference point 216B of the first bushing 210, the third reference point 216C of the second bushing 212, and a wheel center point of the respective one of the wheels 104A, 104B, 104C, 104D in the design position), and/or an eighth example coordinate system (e.g., defined by the second reference point 216B of the first bushing 210, the third reference point 216C of the second bushing 212, and a wheel center point of the respective one of the wheels 104A, 104B, 104C, 104D in the current position). In some examples, one or more different local coordinate systems may be used in addition to or instead of one(s) of the first, second, third, fourth, fifth, sixth, seventh, and eighth local coordinate systems.

In the example of FIG. 5, the suspension position calculation circuitry 510 calculates and/or determines one or more of the output parameters (e.g., shown in the second table 610 of FIG. 6B) for the first suspension system 112A based on the design position(s) of one(s) of the reference points 216 and/or based on the current position of the first suspension sensor 114A. For example, the suspension position calculation circuitry 510 determines current position(s) of the fourth reference point 216D of the lower ball joint 218, the sixth reference point 216F of the lower strut joint 310 of the strut assembly 204, the ninth reference point 216I of the steering link joint 402, and/or the wheel center of the respective one of the wheels 104A, 104B, 104C, 104D. In some examples, for fixed one(s) of the reference points 216 (e.g., one(s) of the reference points 216 that do not move relative to the vehicle body of the vehicle 100), the suspension position calculation circuitry 510 determines that the current position(s) of the fixed one(s) of the reference points 216 correspond to the design position(s) of the fixed one(s) of the reference points 216. In some examples, the fixed ones of the reference points 216 include the second reference point 216B of the first bushing 210, the third reference point 216C of the second bushing 212, and/or the fifth reference point 216E of the upper end 308 of the strut assembly 204. In some examples, the suspension position calculation circuitry 510 maps and/or transforms, using the coordinate transform(s), one(s) of the design positions to one(s) of the local coordinate systems to facilitate calculation of the current position(s) by the suspension position calculation circuitry 510.

In some examples, the suspension position calculation circuitry 510 determines one or more component properties of the respective suspension system(s) 112A, 112B, 112C, 112D based on relative locations of and/or distances between ones of the current positions. For example, the suspension position calculation circuitry 510 determines a control arm angle (e.g., in degrees) of the control arm 202 in the current position based on relative locations between the first bushing 210, the second bushings 212, and the lower ball joint 218 in the current position. In some examples, the suspension position calculation circuitry 510 determines an example strut length (e.g., in mm) in the current position based on a distance between the upper and lower ends of the strut assembly 204 (e.g., between the fifth and sixth reference points 216E, 216F) in the current position. In some examples, the suspension position calculation circuitry 510 determines a coil spring length of the spring 302 in the current position based on a distance between the upper and lower spring points of the spring 302 (e.g., between the seventh and eighth reference points 216G, 216H) in the current position. In some examples, the suspension position calculation circuitry 510 determines a toe angle, a camber angle, and/or a caster angle of the respective the first wheel 104A in the current position based on relative locations of the wheel center point with respect to one(s) of the reference points 216 in the current position.

In some examples, the suspension position calculation circuitry 510 determines one or more additional component properties in the current position. For example, the suspension position calculation circuitry 510 can determine a jounce bumper length based on a distance between upper and lower points on a jounce bumper of the strut assembly 204, and/or can determine a rebound bumper length based on a distance between upper and lower points on a rebound bumper of the strut assembly 204. In some examples, the suspension position calculation circuitry 510 provides the calculated current positions and/or current component properties to the database 520 for storage. In some examples, the suspension position calculation circuitry 510 is instantiated by programmable circuitry executing suspension position calculation circuitry instructions and/or configured to perform operations such as those represented by the flowchart(s) of FIGS. 9, 10, 11, and/or 12.

The example position adjustment circuitry 512 of FIG. 5 updates and/or adjusts the current position(s) of the wheel center(s) determined for the respective one(s) of the wheels 104A, 104B, 104C, 104D. For example, to improve accuracy of the calculated wheel center position for a given wheel (e.g., the fourth wheel 104D), the position adjustment circuitry 512 adjusts the wheel center position based on the calculated wheel center positions of remaining ones of the wheels (e.g., the first wheel 104A, the second wheel 104B, and the third wheel 104C). In some examples, by adjusting the wheel center positions based on the calculated wheel center positions of remaining ones of the wheels 104A, 104B, 104C, 104D, the position adjustment circuitry 512 can mitigate effects of local ground-level disturbances (e.g., potholes, bumps, and/or other protrusions) on the resulting position and/or wheel-end force estimations. In some examples, the position adjustment circuitry 512 accesses (e.g., from the database 520) current positions and/or design positions of respective wheel centers of the wheels 104A, 104B, 104C, 104D as determined and/or identified by the input interface circuitry 502 and/or the suspension position calculation circuitry 510 of FIG. 5.

In this example, the position adjustment circuitry 512 accesses and/or obtains, with respect to the global coordinate system 126 of FIG. 1, a first x-axis position and a first y-axis position of a first wheel center of the first wheel 104A at the design position (e.g., $x_A$ and $y_A$), a second x-axis position and a second y-axis position of a second wheel center of the second wheel 104B at the design position (e.g., $x_B$ and $y_B$), a third x-axis position and a third y-axis position of a third wheel center of the third wheel 104C at the design position (e.g., $x_C$ and $y_C$), a fourth x-axis position and a fourth y-axis position of a fourth wheel center of the fourth wheel 104D at the design position (e.g., $x_D$ and $y_D$), a first z-axis position of the first wheel center of the first wheel 104A at the current position (e.g., $z'_A$), a second z-axis position of the second wheel center of the second wheel 104B at the current position (e.g., $z'_B$), and a third z-axis position of the third wheel center of the third wheel 104C at the current position (e.g., $z'_C$). In some examples, based on example Equation 7 below, the position adjustment circuitry 512 determines an adjusted z-axis position of the fourth wheel 104D at the current position (e.g., $z''_D$).

$$z''_D = (((y_B - y_A) * (z'_C - z'_B) - (z'_B - z'_A) * (y_C - y_B)) * (x_D - x_A) +$$

$$((z'_B - z'_A) * (x_C - x_B) - (x_B - x_A) * (z'_C - z'_B)) * (y_D - y_A)) /$$

(Equation 7)

-continued $$(-((x_B - x_A) * (y_C - y_B) - (y_B - y_A) * (x_c - x_B))) + z'_A$$

While example Equation 7 above is used to calculate the adjusted current z-axis position for the fourth wheel 104D, the position adjustment circuitry 512 similarly determines adjusted current z-axis positions for remaining ones of the wheels (e.g., the first wheel 104A, the second wheel 104B, and/or the third wheel 104C) based on example Equation 7 above and/or based on the current positions and/or the design positions of the wheel centers of remaining ones of the wheels 104A, 104B, 104C, 104D. In some examples, the position adjustment circuitry 512 provides the adjusted current wheel center positions of the respective wheels 104A, 104B, 104C, 104D to the database 520 for storage. In some examples, the position adjustment circuitry 512 is instantiated by programmable circuitry executing position adjustment circuitry instructions and/or configured to perform operations such as those represented by the flowchart(s) of FIGS. 9, 10, 11, and/or 12.

The example force estimation circuitry 514 of FIG. 5 determines example force(s) (e.g., wheel-end forces) corresponding to respective one(s) of the wheels 104A, 104B, 104C, 104D and/or the suspension system(s) 112A, 112B, 112C, 112D. For example, the force estimation circuitry 514 executes an example force accumulation model for respective one(s) of the wheels 104A, 104B, 104C, 104D to determine and/or output the corresponding wheel-end force(s). As used herein, the wheel-end force on a particular wheel 104A, 104B, 104C, 104D refers to a force exerted by the particular wheel 104A, 104B, 104C, 104D on the ground. In some examples, the wheel-end force can be measured directly using a force gauge or scale placed between the reaction surfaces (e.g., the particular wheel 104A, 104B, 104C, 104D and the ground), and/or can be measured (e.g., quantified) indirectly based on suspension component displacement and/or deformation. In some examples, the force estimation circuitry 514 determines the wheel-end forces based on example input data including current position(s) of one(s) of the reference points 216 and component properties of one of the suspension systems 112A, 112B, 112C, 112D associated with the wheel 104A, 104B, 104C, 104D.

For example, FIG. 7A illustrates a third example table 700 representing example input data utilized by the example force estimation circuitry 514 of FIG. 5 to estimate a first example wheel-end force on the first wheel 104A. In the illustrated example of FIG. 7A, the third table 700 represents the input data corresponding to the first suspension system 112A. For example, a first example column 702 of the third table 700 includes first example labels (e.g., descriptions) 704A representative of respective ones of the reference points 216, including the wheel center of the first wheel 104A in the design position, the wheel center of the first wheel 104A in the current position, a lower point on the jounce bumper in the current position, and an upper point on the rebound bumper in the current position. In some examples, one or more additional reference points 216 can be represented in the first column 702. In some examples, the third table 700 can include one or more additional reference points and/or component properties associated with other suspension components that contribute to a characteristic force-displacement relationship of the first suspension system 112A.

Additionally, the first column 702 includes second example labels 704B corresponding to respective component properties of the first suspension system 112A in the current position. In some examples, first ones of the component properties are variable component properties determined by the suspension position calculation circuitry 510 of FIG. 5 for the first suspension system 112A in the current position (e.g., the strut length, the coil spring length, the control arm angle, the camber angle, and/or the caster angle). Additionally, second ones of the component properties are fixed component properties determined and/or obtained by the input interface circuitry 502 of FIG. 5 (e.g., the strut spring rate of the strut assembly 204, the coil spring rate of the spring 302, the coil spring free length of the spring 302, the first bushing spring rate of the first bushing, the second bushing spring rate of the second bushing 212, the first bushing windup angle of the first bushing 210, the second bushing windup angle of the second bushing 212, the jounce bumper spring rate, and/or the rebound bumper spring rate). In the example of FIG. 7A, a second example column 706 indicates example notations and/or measurement units used to represent the current positions and/or values corresponding to one(s) of the reference points 216 and/or the component properties of the first column 702.

Returning to FIG. 5, the force estimation circuitry 514 calculates the wheel-end forces on corresponding ones of the wheels 104A, 104B, 104C, 104D based on differences (e.g., displacement and/or deformation) between component properties in the design position (e.g., design component properties) and corresponding component properties in the current position (e.g., current component properties) for respective ones of the suspension systems 112A, 112B, 112C, 112D. An example process to determine a first wheel-end force on the first wheel 104A is described below. However, the process can similarly be performed for remaining one(s) of the wheels 104B, 104C, 104D to determine the wheel-end force(s) on the one(s) of the wheels 104B, 104C, 104D.

In the example of FIG. 5, the force estimation circuitry 514 determines and/or obtains the design component properties for respective component(s) of the first suspension system 112A associated with the first wheel 104A. In some examples, the force estimation circuitry 514 determines one(s) of the design component properties of the first suspension system 112A based on the design position(s) of one(s) of the reference points 216 (e.g., as shown in the first table 600 of FIG. 6A). For example, the force estimation circuitry 514 determines a design control arm angle of the control arm 202 based on relative locations between the first and second bushings 210, 212 and the lower ball joint 218 in the design position. In some examples, the force estimation circuitry 514 determines a design strut length of the strut assembly 204 based on a distance between the upper and lower ends 308, 310 of the strut assembly 204 (e.g., between the fifth and sixth reference points 216E, 216F) in the design position. In some examples, the force estimation circuitry 514 determines a design coil spring length of the spring 302 in the design position based on a distance between upper and lower points of the spring 302 (e.g., between the seventh and eighth reference points 216G, 216H) in the design position. In some examples, the force estimation circuitry 514 determines a design toe angle, a design camber angle, and/or a design caster angle of the first wheel 104A based on relative locations between the wheel center point and one(s) of the reference points 216 in the design position. In some examples, the force estimation circuitry 514 determines a design length of the jounce bumper based on a distance between upper and lower points of the jounce bumper in the design position. In some examples, the force estimation circuitry 514 determines a design length of the rebound bumper based on a distance between upper and lower points of rebound bumper in the design position.

In the example of FIG. 5, the force estimation circuitry 514 determines and/or obtains the current component properties for respective component(s) of the first suspension system 112A associated with the first wheel 104A. For example, the force estimation circuitry 514 obtains the current component properties for the first suspension system 112A (e.g., shown in the third table 700 of FIG. 7A) determined and/or obtained by the input interface circuitry 502 and/or the suspension position calculation circuitry 510 of FIG. 5. Further, the force estimation circuitry 514 obtains the adjusted current wheel center position of the first wheel determined and/or output by the position adjustment circuitry 512. In some such examples, the force estimation circuitry 514 adjusts one(s) of the current component properties based on the adjusted current wheel center position.

In some examples, the force estimation circuitry 514 determines and/or calculates example component forces resulting from compression and/or torsion of one or more components of the first suspension system 112A. For example, the compression and/or torsion may result from a load (e.g., weight) of the vehicle 100 being applied and/or distributed to the component(s) of the first suspension system 112A. As such, the amount of compression and/or torsion of the component(s) can be used to estimate the weight and/or mass of the vehicle 100 in some examples.

In some examples, the force estimation circuitry 514 determines displacement and/or deformation of the component(s) between the design position and the current position. For example, the force estimation circuitry 514 determines an amount of compression (e.g., in mm) and/or a twist angle (e.g., in degrees) of the component(s) based on difference(s) (e.g., distances) between the design component properties in the design position and the current component properties in the current position. For example, the force estimation circuitry 514 determines a first compression amount of the strut assembly 204 based a difference between the design strut length and the current strut length of the strut assembly 204. In some examples, the force estimation circuitry 514 determines a second compression amount of the spring 302 based on a difference between the design coil spring length and the current coil spring length of the spring 302. In some examples, the force estimation circuitry 514 determines a first twist angle of the first bushing 210 based on a difference between the first windup angle of the first bushing 210 and the current angle of the first bushing 210. In some examples, the force estimation circuitry 514 determines a second twist angle of the second bushing 212 based on a difference between the second windup angle of the second bushing 212 and the current angle of the second bushing 212. In some examples, the force estimation circuitry 514 determines a third compression amount of the jounce bumper based on a difference between the design jounce bumper length and the current jounce bumper length of the jounce bumper. In some examples, the force estimation circuitry 514 determines a fourth compression amount of the rebound bumper based on a difference between the design rebound bumper length and the current rebound bumper length. In some examples, the force estimation circuitry 514 determines a change in wheel orientation of the first wheel 104A based on change(s) between the initial toe angle and the current toe angle, the initial camber angle and the current camber angle, and/or the initial caster angle and the current caster angle.

In some examples, the force estimation circuitry 514 calculates, based on the compression amount(s) and/or the twist angle(s), example component forces resulting from the compression and/or torsion of the corresponding component (s). For example, FIG. 7B illustrates a fourth example table 710 representative of example component forces calculated and/or determined by the force estimation circuitry 514 of FIG. 5. In the illustrated example of FIG. 7B, a first column 712 of the fourth table 710 including third labels 716 representing the respective component forces calculated for the first suspension system 112A. For example, the component forces include a strut force resulting from compression of the strut assembly 204, a coil spring force resulting from compression of the spring 302, a first bushing force resulting from twist of the first bushing 210, a second bushing force resulting from twist of the second bushing 212, a jounce bumper force resulting from compression of the jounce bumper, a rebound bumper force resulting from compression of the rebound bumper, and a wheel force (e.g., a tire force) resulting from a change in orientation (e.g., a change camber angle, caster angle, and/or toe angle) of the first wheel 104A. In some examples, the component forces can include one or more additional forces in addition to or instead of one(s) of the component forces represented in FIG. 7B.

Returning to FIG. 5, the force estimation circuitry 514 calculates a first component force (e.g., the strut force) based on the first compression amount of the strut assembly 204 and the strut spring rate of the strut assembly 204. In some examples, the force estimation circuitry 514 calculates a second component force (e.g., the coil spring force) based on the second compression amount of the spring 302 and the coil spring rate of the spring 302. In some examples, the force estimation circuitry 514 calculates a third component force (e.g., the first bushing force) based on the first twist angle of the first bushing 210 and the first bushing spring rate of the first bushing 210. In some examples, the force estimation circuitry 514 calculates a fourth component force (e.g., the second bushing force) based on the second twist amount of the second bushing 212 and the second bushing spring rate of the second bushing 212. In some examples, the force estimation circuitry 514 calculates a fifth component force (e.g., the jounce bumper force) based on the third compression amount of the jounce bumper and the jounce bumper spring rate. In some examples, the force estimation circuitry 514 calculates a sixth component force (e.g., the rebound bumper force) based on the fourth compression amount of the rebound bumper and the rebound bumper spring rate. In some examples, the force estimation circuitry 514 calculates a seventh example force based on the change in wheel orientation (e.g., the change in toe angle, the camber angle, and/or the caster angle) of the first wheel 104A calculated based on the change in orientation of the knuckle 206. For example, the wheel orientation force is based on a lateral force induced by friction between the first wheel 104A and a reaction surface (e.g., the ground) holding the first wheel 104A stationary, where the lateral force may be proportional (e.g., directly proportional) to a degree of induced camber angle for a given amount of wheel slip.

In the example of FIG. 5, the force estimation circuitry 514 calculates the first wheel-end force at the first wheel 104A based on an aggregation (e.g., a summation) of the component forces determined for the component(s) of the first suspension system 112A. For example, the force estimation circuitry 514 aggregates (e.g., sums) the first component force associated with the strut assembly 204, the second component force associated with the spring 302, the third component force associated with the first bushing 210, the fourth component force associated with the second bushing 212, the fifth component force associated with the jounce bumper, the sixth component force associated with the rebound bumper, and/or the seventh component force associated with the wheel orientation to determine and/or output the first wheel-end force of the first wheel 104A.

In some examples, the force estimation circuitry 514 similarly determines the wheel-end force(s) corresponding to remaining one(s) of the wheels 104B, 104C, 104C (e.g., based on the current positions and/or the design positions associated with respective one(s) of the wheels 104B, 104C, 104D and/or the suspension systems 112A, 112B, 112C). For example, the force estimation circuitry 514 can execute the force estimation process for respective one(s) of the wheels 104B, 104C, 104D to determine a second wheel-end force corresponding to the second wheel 104B, a third wheel-end force corresponding to the third wheel 104C, and/or a fourth wheel-end force corresponding to the fourth wheel 104D. In some examples, the force estimation circuitry 514 provides the calculated wheel-end force(s) to the database 520 of FIG. 5 for storage.

In some examples, the force estimation circuitry 514 can evaluate and/or adjust one(s) of the wheel-end forces based on example prognostic data associated with the vehicle 100, the wheel(s) 104A, 104B, 104C, 104D, and/or one or more suspension components of the suspension systems 112A, 112B, 112C, 112D. For example, the prognostic data can be stored in the example database 520 and can include, for example, an expected life cycle (e.g., fatigue life) of one or more of the suspension components (e.g., the spring 302, the jounce jumper, the rebound bumper, the first bushing 210, the second bushing 212, etc.). In some examples, the force estimation circuitry 514 can adjust one(s) of the component properties based on a comparison between the expected fatigue life and a current age of the corresponding suspension component(s). In some such examples, the force estimation circuitry 514 can adjust and/or re-evaluate the wheel-end force(s) determined for corresponding one(s) of the wheels 104A, 104B, 104C, 104D based on the adjusted component properties. In some examples, the force estimation circuitry 514 is instantiated by programmable circuitry executing force estimation circuitry instructions and/or configured to perform operations such as those represented by the flowchart(s) of FIGS. 9, 10, 11, and/or 12.

The example vehicle mass estimation circuitry 516 of FIG. 5 determines and/or estimates an example vehicle mass of the vehicle 100 based on the wheel-end forces determined for respective ones of the wheels 104A, 104B, 104C, 104D. In some examples, the vehicle mass estimation circuitry 516 determines, based on the wheel-end forces, an example front axle mass of the front axle 110A of the vehicle 100 and/or an example rear axle mass of the rear axle 110B of the vehicle 100. For example, the vehicle mass estimation circuitry 516 determines the front axle mass by aggregating (e.g., summing) the first and second wheel-end forces of the respective first and second wheels 104A, 104B, and/or determines the rear axle mass by aggregating (e.g., summing) the third and fourth wheel-end forces of the respective third and fourth wheels 104C, 104D. In some examples, the vehicle mass estimation circuitry 516 determines the vehicle mass (e.g., a total vehicle mass) of the vehicle 100 based on an aggregation (e.g., a sum) of the front axle mass and the rear axle mass. In some examples, the vehicle mass estimation circuitry 516 provides the front axle mass, the rear axle mass, and/or the vehicle mass to the example database 520 for storage. In some examples, the vehicle mass estimation circuitry 516 is instantiated by programmable circuitry executing vehicle mass estimation circuitry instructions and/ or configured to perform operations such as those represented by the flowchart(s) of FIGS. 9, 10, 11, and/or 12.

The example user interface circuitry 518 presents, via the example user interface 125 of FIG. 5, example vehicle information calculated and/or obtained for the example vehicle 100. For example, the user interface circuitry 518 can present, via the user interface 125, the wheel end force(s) at respective one(s) of the wheels 104A, 104B, 104C, 104D, the front axle mass, the rear axle mass, and/or the vehicle mass of the vehicle 100. In some examples, the user interface circuitry 518 presents, via the user interface 125, proportion(s) (e.g., percentage(s)) of the vehicle mass, the front axle mass, and/or the rear axle mass relative to corresponding mass thresholds of the vehicle 100. For example, the user interface circuitry 518 determines a first proportion of the calculated vehicle mass relative to a vehicle mass threshold, a second proportion of the calculated front axle mass relative to a front axle mass threshold, and/or a third proportion of the calculated rear axle mass relative to a rear axle mass threshold. In some examples, the mass threshold(s) may be user-selected, and/or may be determined based on regulatory weight limits associated with a particular geographic region of the vehicle 100. In some examples, the user interface circuitry 518 is instantiated by programmable circuitry executing user interface circuitry instructions and/or configured to perform operations such as those represented by the flowchart(s) of FIGS. 9, 10, 11, and/or 12.

Figure 8:
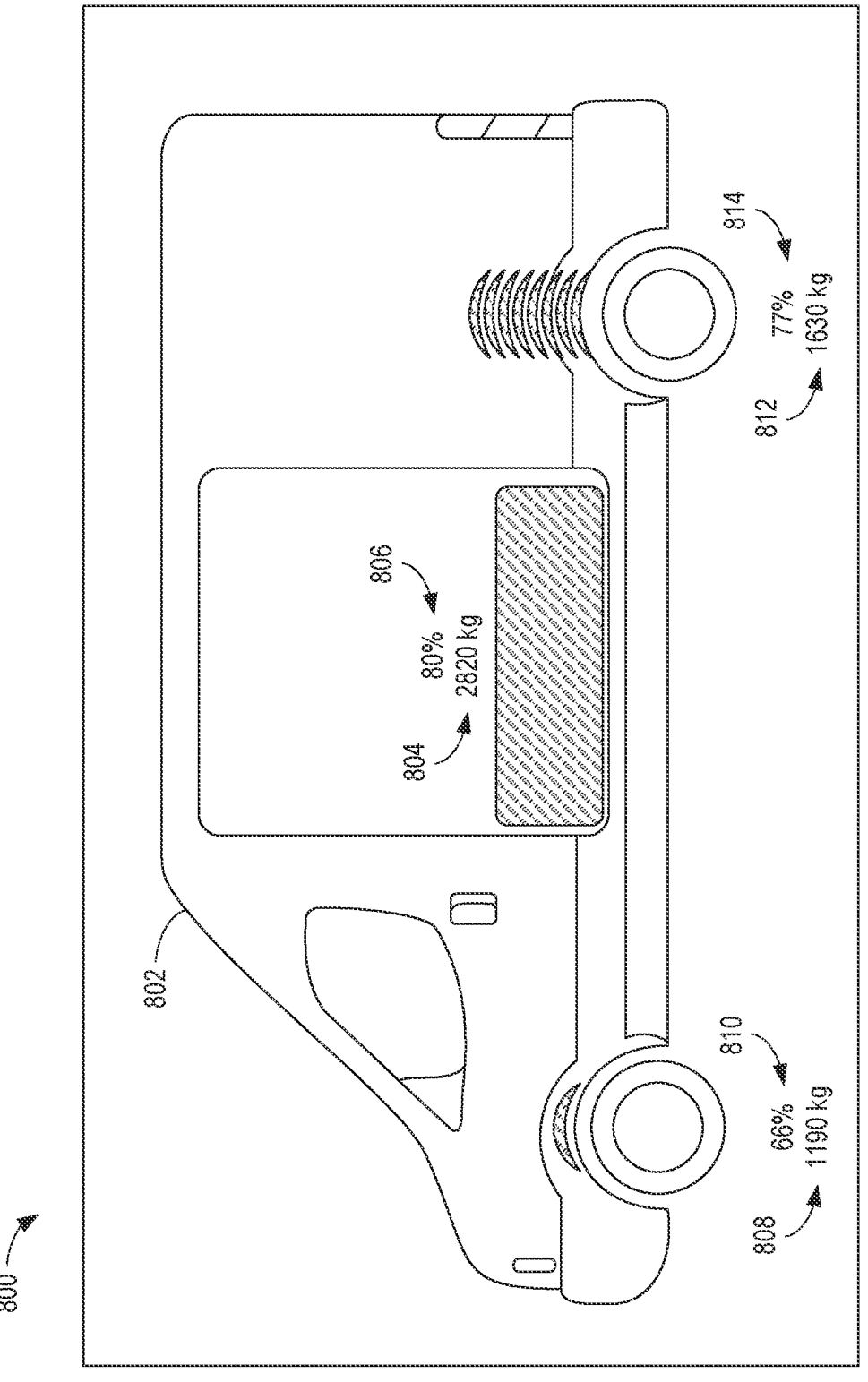
FIG. 8 illustrates example display information that can be presented via an example user interface.

As an example, FIG. 8 illustrates example display information 800 that can be generated by the example user interface circuitry 518 of FIG. 5 and/or presented via the user interface 125 of FIG. 1. In the illustrated example of FIG. 8, the display information 800 includes a side profile of an example vehicle 802 for which example mass information is determined (e.g., by the mass estimation circuitry 102 of FIGS. 1 and/or 2). In this example, the display information 800 includes a vehicle mass 804 (e.g., in kilograms (kg)) of the vehicle 802, a first percentage 806 associated with the vehicle mass 804 (e.g., relative to a vehicle mass threshold of the vehicle 802), a front axle mass 808 of the vehicle 802, a second percentage 810 associated with the front axle mass 808 (e.g., relative to a front axle mass threshold of the vehicle 802), a rear axle mass 812 of the vehicle 802, and/or a third percentage 814 associated with the rear axle mass 812 (e.g., relative to a rear axle mass threshold of the vehicle 802). In some examples, the display information 800 can include, additionally or alternatively, other information (e.g., the wheel-end force(s)) determined and/or obtained for the vehicle 802.

In some examples, the mass estimation circuitry 102 includes means for obtaining input data. For example, the means for obtaining input data may be implemented by the input interface circuitry 502. In some examples, the input interface circuitry 502 may be instantiated by programmable circuitry such as the example programmable circuitry 1512 of FIG. 15. For instance, the input interface circuitry 502 may be instantiated by programmable circuitry executing machine executable instructions such as those implemented by at least blocks 902, 904 of FIG. 9. In some examples, input interface circuitry 502 may be instantiated by hardware logic circuitry, which may be implemented by an ASIC, XPU, or FPGA circuitry configured and/or structured to perform operations corresponding to the machine readable instructions. Additionally or alternatively, the input interface circuitry 502 may be instantiated by any other combination of hardware, software, and/or firmware. For example, the input interface circuitry 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for normalizing. For example, the means for normalizing may be implemented by the normalization circuitry 504. In some examples, the normalization circuitry 504 may be instantiated by programmable circuitry such as the example programmable circuitry 1512 of FIG. 15. For instance, the normalization circuitry 504 may be instantiated by programmable circuitry executing machine executable instructions such as those implemented by at least block 906 of FIG. 9. In some examples, normalization circuitry 504 may be instantiated by hardware logic circuitry, which may be implemented by an ASIC, XPU, or FPGA circuitry configured and/or structured to perform operations corresponding to the machine readable instructions. Additionally or alternatively, the normalization circuitry 504 may be instantiated by any other combination of hardware, software, and/or firmware. For example, the normalization circuitry 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for calibrating. For example, the means for calibrating may be implemented by the sensor calibration circuitry 506. In some examples, the sensor calibration circuitry 506 may be instantiated by programmable circuitry such as the example programmable circuitry 1512 of FIG. 15. For instance, the sensor calibration circuitry 506 may be instantiated by programmable circuitry executing machine executable instructions such as those implemented by at least block 908 of FIG. 9. In some examples, sensor calibration circuitry 506 may be instantiated by hardware logic circuitry, which may be implemented by an ASIC, XPU, or FPGA circuitry configured and/or structured to perform operations corresponding to the machine readable instructions. Additionally or alternatively, the sensor calibration circuitry 506 may be instantiated by any other combination of hardware, software, and/or firmware. For example, the sensor calibration circuitry 506 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for calculating a body position. For example, the means for calculating a body position may be implemented by the body position calculation circuitry 508. In some examples, the body position calculation circuitry 508 may be instantiated by programmable circuitry such as the example programmable circuitry 1512 of FIG. 15. For instance, the body position calculation circuitry 508 may be instantiated by programmable circuitry executing machine executable instructions such as those implemented by at least block 910 of FIG. 9 and/or blocks 1002, 1004, 1006 of FIG. 10. In some examples, body position calculation circuitry 508 may be instantiated by hardware logic circuitry, which may be implemented by an ASIC, XPU, or FPGA circuitry configured and/or structured to perform operations corresponding to the machine readable instructions. Additionally or alternatively, the body position calculation circuitry 508 may be instantiated by any other combination of hardware, software, and/or firmware. For example, the body position calculation circuitry 508 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for calculating a suspension position. For example, the means for calculating a suspension position may be implemented by the suspension position calculation circuitry 510. In some examples, the suspension position calculation circuitry 510 may be instantiated by programmable circuitry such as the example programmable circuitry 1512 of FIG. 15. For instance, the suspension position calculation circuitry 510 may be instantiated by programmable circuitry executing machine executable instructions such as those implemented by at least block 912 of FIG. 9 and/or blocks 1102, 1104, 1106, 1108, 1110, 1112, 1114, 1116, 1118, 1120, 1122, 1124 of FIG. 11. In some examples, suspension position calculation circuitry 510 may be instantiated by hardware logic circuitry, which may be implemented by an ASIC, XPU, or FPGA circuitry configured and/or structured to perform operations corresponding to the machine readable instructions. Additionally or alternatively, the suspension position calculation circuitry 510 may be instantiated by any other combination of hardware, software, and/or firmware. For example, the suspension position calculation circuitry 510 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for adjusting a position. For example, the means for adjusting a position may be implemented by the position adjustment circuitry 512. In some examples, the position adjustment circuitry 512 may be instantiated by programmable circuitry such as the example programmable circuitry 1512 of FIG. 15. For instance, the position adjustment circuitry 512 may be instantiated by programmable circuitry executing machine executable instructions such as those implemented by at least block 914 of FIG. 9. In some examples, position adjustment circuitry 512 may be instantiated by hardware logic circuitry, which may be implemented by an ASIC, XPU, or FPGA circuitry configured and/or structured to perform operations corresponding to the machine readable instructions. Additionally or alternatively, the position adjustment circuitry 512 may be instantiated by any other combination of hardware, software, and/or firmware. For example, the position adjustment circuitry 512 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for estimating force. For example, the means for estimating force may be implemented by the force estimation circuitry 514. In some examples, the force estimation circuitry 514 may be instantiated by programmable circuitry such as the example programmable circuitry 1512 of FIG. 15. For instance, the force estimation circuitry 514 may be instantiated by programmable circuitry executing machine executable instructions such as those implemented by at least block 916 of FIG. 9 and/or blocks 1202, 1204, 1206, 1208, 1210, 1212, 1214, 1216, 1218, 1220, 1222 of FIG. 12. In some examples, the force estimation circuitry 514 may be instantiated by hardware logic circuitry, which may be implemented by an ASIC, XPU, or FPGA circuitry configured and/or structured to perform operations corresponding to the machine readable instructions. Additionally or alternatively, the force estimation circuitry 514 may be instantiated by any other combination of hardware, software, and/or firmware. For example, the force estimation circuitry 514 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for estimating mass. For example, the means for estimating mass may be implemented by the vehicle mass estimation circuitry 516. In some examples, the vehicle mass estimation circuitry 516 may be instantiated by programmable circuitry such as the example programmable circuitry 1512 of FIG. 15. For instance, the vehicle mass estimation circuitry 516 may be instantiated by programmable circuitry executing machine executable instructions such as those implemented by at least blocks 918, 920 of FIG. 9. In some examples, the vehicle mass estimation circuitry 516 may be instantiated by hardware logic circuitry, which may be implemented by an ASIC, XPU, or FPGA circuitry configured and/or structured to perform operations corresponding to the machine readable instructions. Additionally or alternatively, the vehicle mass estimation circuitry 516 may be instantiated by any other combination of hardware, software, and/or firmware. For example, the vehicle mass estimation circuitry 516 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the mass estimation circuitry 102 includes means for controlling a user interface. For example, the means for controlling a user interface may be implemented by the user interface circuitry 518. In some examples, the user interface circuitry 518 may be instantiated by programmable circuitry such as the example programmable circuitry 1512 of FIG. 15. For instance, the user interface circuitry 518 may be instantiated by programmable circuitry executing machine executable instructions such as those implemented by at least block 922 of FIG. 9. In some examples, the user interface circuitry 518 may be instantiated by hardware logic circuitry, which may be implemented by an ASIC, XPU, or FPGA circuitry configured and/or structured to perform operations corresponding to the machine readable instructions. Additionally or alternatively, the user interface circuitry 518 may be instantiated by any other combination of hardware, software, and/or firmware. For example, the user interface circuitry 518 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the mass estimation circuitry 102 of FIG. 1 is illustrated in FIG. 5, one or more of the elements, processes, and/or devices illustrated in FIG. 5 may be combined, divided, re-arranged, omitted, eliminated, and/or implemented in any other way. Further, the example input interface circuitry 502, the example normalization circuitry 504, the example sensor calibration circuitry 506, the example body position calculation circuitry 508, the example suspension position calculation circuitry 510, the example position adjustment circuitry 512, the example force estimation circuitry 514, the example vehicle mass estimation circuitry 516, the example user interface circuitry 518, the example database 520, and/or, more generally, the example mass estimation circuitry 102 of FIG. 5, may be implemented by hardware alone or by hardware in combination with software and/or firmware. Thus, for example, any of the example input interface circuitry 502, the example normalization circuitry 504, the example sensor calibration circuitry 506, the example body position calculation circuitry 508, the example suspension position calculation circuitry 510, the example position adjustment circuitry 512, the example force estimation circuitry 514, the example vehicle mass estimation circuitry 516, the example user interface circuitry 518, the example database 520, and/or, more generally, the example mass estimation circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example mass estimation circuitry 102 of FIG. 5 may include one or more elements, processes, and/or devices in addition to, or instead of, those illustrated in FIG. 5, and/or may include more than one of any or all of the illustrated elements, processes and devices.

Figure 10:
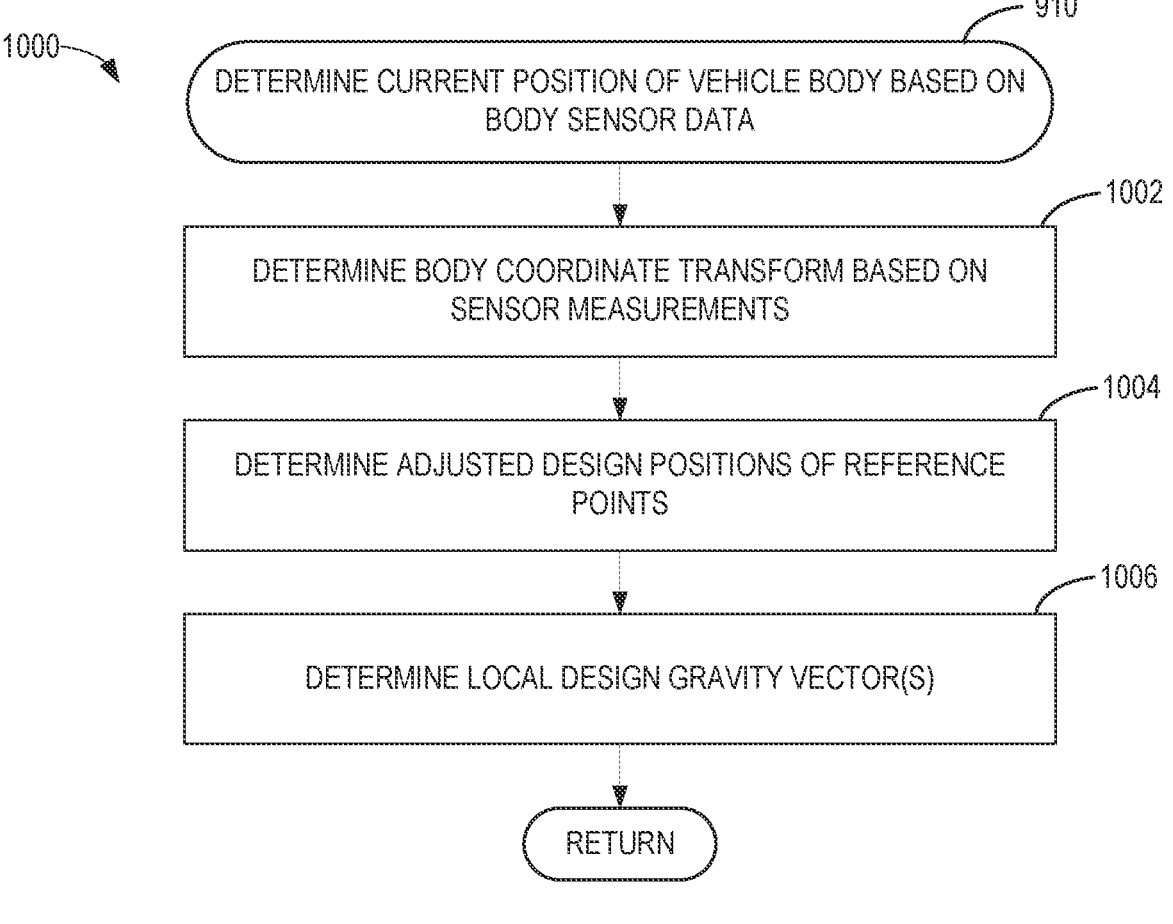
FIG. 10 is a flowchart representative of example machine readable instructions and/or example operations that may be executed, instantiated, and/or performed by the example mass estimation circuitry of FIGS. 1 and/or 5 to determine a current position of a vehicle body of the example vehicle of FIG. 1.
Figure 11:
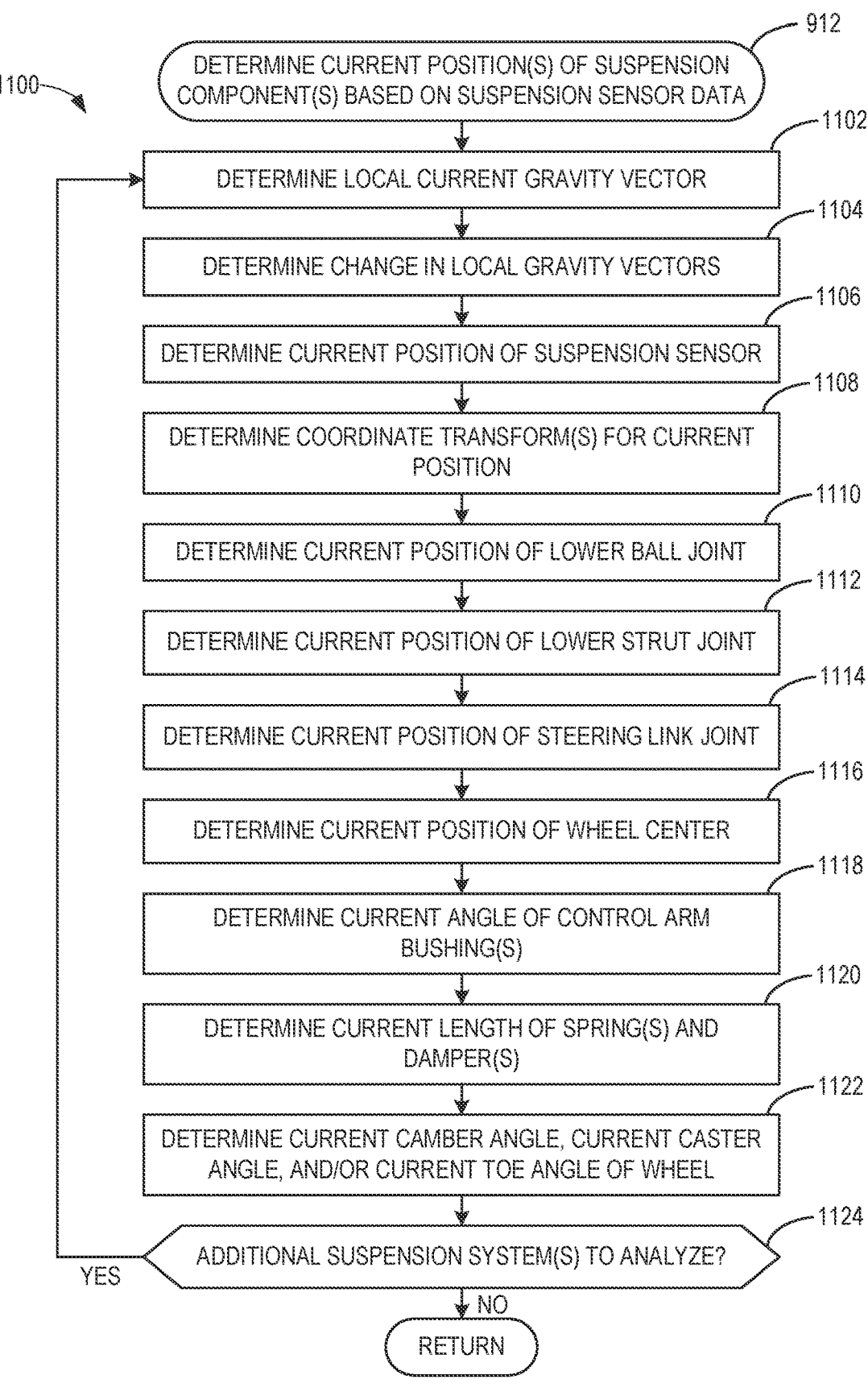
FIG. 11 is a flowchart representative of example machine readable instructions and/or example operations that may be executed, instantiated, and/or performed by the example mass estimation circuitry of FIGS. 1 and/or 5 to determine current positions of one or more suspension system components of the example vehicle of FIG. 1.

Flowchart(s) representative of example machine readable instructions, which may be executed by programmable circuitry to implement and/or instantiate the mass estimation circuitry 102 of FIG. 5 and/or representative of example operations which may be performed by programmable circuitry to implement and/or instantiate the mass estimation circuitry 102 of FIG. 5, are shown in FIGS. 9, 10, 11, and/or 12. The machine readable instructions may be one or more executable programs or portion(s) of one or more executable programs for execution by programmable circuitry such as the programmable circuitry 1512 shown in the example processor platform 1500 discussed below in connection with FIG. 15. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9, 10, 11, and/or 12, many other methods of implementing the example mass estimation circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9, 10, 11, and/or 12 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 9 is a flowchart representative of example machine readable instructions and/or example operations 900 that may be executed, instantiated, and/or performed by the example mass estimation circuitry 102 of FIGS. 1, 2, and/or 5 to estimate vehicle mass of a vehicle (e.g., the example vehicle 100 of FIG. 1). The example machine-readable instructions and/or the example operations 900 of FIG. 9 begin at block 902, at which the example mass estimation circuitry 102 accesses sensor data from one or more sensor(s) of the vehicle 100. For example, the example input interface circuitry 502 of FIG. 5 accesses and/or obtains, from one(s) of the example suspension sensors 114A, 114B, 114C, 114D of FIG. 1, the example suspension sensor data 521 representative of measured accelerations of the suspension sensors 114A, 114B, 114C, 114D. In some examples, the input interface circuitry 502 accesses and/or obtains, from the example body sensor 116 of FIG. 1, the example body sensor data 522 representative of measured acceleration of the body sensor 116.

At block 904, the example mass estimation circuitry 102 accesses the example reference data 524 associated with the vehicle 100. For example, the input interface circuitry 502 accesses the reference data 524 from an example vehicle model (e.g., a computer aided design (CAD) model) of the vehicle 100 representative of one or more example design positions associated with corresponding ones of the reference points 216 on the vehicle 100.

At block 906, the example mass estimation circuitry 102 normalizes the sensor data for gravity. For example, the example normalization circuitry 504 of FIG. 5 normalizes (e.g., with respect to gravity) acceleration measurements included in the suspension sensor data 521 and/or the body sensor data 522. In some examples, the normalization circuitry 504 determines one or more example gain value(s) to be applied to one(s) of the acceleration measurements to normalize the acceleration measurements for gravity. In some examples, the normalization circuitry 504 determines a common gain for multiple ones of the acceleration measurements. In some examples, the normalization circuitry 504 determines multiple gain values corresponding to respective ones of the acceleration measurements.

At block 908, the example mass estimation circuitry 102 calibrates the sensor data. For example, the example sensor calibration circuitry 506 of FIG. 5 calibrates the acceleration measurements included in the suspension sensor data 521 and/or the body sensor data 522 based on actual positions (e.g., mounting positions) of the respective sensor(s) 116, 114A, 114B, 114C, 114D on the vehicle 100. In some examples, the sensor calibration circuitry 506 obtains baseline sensor measurements and/or baseline force measurements corresponding to respective one(s) of the sensors 116, 114A, 114B, 114C, 114D, and the sensor calibration circuitry 506 determines offset correction values and/or gain correction values based on the baseline measurements for respective one(s) of the sensors 116, 114A, 114B, 114C, 114D.

At block 910, the example mass estimation circuitry 102 determines a current position of the example vehicle body 106 of the vehicle 100 based on the body sensor data 522. For example, the example body position calculation circuitry 508 of FIG. 5 executes an example vehicle body model based on the body sensor data 522 to determine the current position of the vehicle body 106 as described below in connection with FIG. 10.

At block 912, the example mass estimation circuitry 102 determines current positions of one or more example suspension components based on the suspension sensor data 521. For example, the example suspension position calculation circuitry 510 determines the current positions of the example reference points 216 corresponding to the suspension components of respective one(s) of the example suspension systems 112A, 112B, 112C, 112D of FIG. 1. In some examples, the suspension position calculation circuitry 510 executes an example kinematic suspension model based on the suspension sensor data 521 to determine the current position(s) of the reference points 216 as described below in connection with FIG. 11.

At block 914, the example mass estimation circuitry 102 adjusts the current position(s) of wheel centers of the respective wheels 104A, 104B, 104C, 104D. For example, the example position adjustment circuitry 512 of FIG. 5 adjusts the current wheel center positions based on relative locations of the design wheel center positions and the current wheel center position. In some examples, the position adjustment circuitry 512 executes, for respective one(s) of the wheels 104A, 104B, 104C, 104D, example Equation 7 above based on the design wheel center positions and/or the current wheel center positions of remaining ones of the wheels 104A, 104B, 104C, 104D. In some examples, as a result of the execution, the position adjustment circuitry 512 outputs adjusted current wheel center position(s) for respective one(s) of the wheels 104A, 104B, 104C, 104D.

At block 916, the example mass estimation circuitry 102 determines example wheel-end force(s) based on the design positions and corresponding current positions of one or more of the suspension components. For example, the example force estimation circuitry 514 of FIG. 5 determines the wheel-end forces for respective ones of the wheels 104A, 104B, 104C, 104D by executing an example force estimation model as described below in connection with FIG. 12.

At block 918, the example mass estimation circuitry 102 determines an example front axle mass and/or an example rear axle mass based on the wheel-end force(s). For example, the example vehicle mass estimation circuitry 516 of FIG. 5 determines the front axle mass by aggregating (e.g., summing) the first and second wheel-end forces of the respective first and second wheels 104A, 104B, and/or determines the rear axle mass by aggregating (e.g., summing) the third and fourth wheel-end forces of the respective third and fourth wheels 104C, 104D.

At block 920, the example mass estimation circuitry 102 determines an example vehicle mass based on the front axle mass and/or the rear axle mass. For example, the vehicle mass estimation circuitry 516 determines the vehicle mass (e.g., a total vehicle mass) of the vehicle 100 based on an aggregation (e.g., a sum) of the front axle mass and the rear axle mass.

At block 922, the example mass estimation circuitry 102 causes presentation of one or more example vehicle parameters determined for the vehicle 100. For example, the example user interface circuitry 518 of FIG. 5 can present, via the user interface 125, the wheel end force(s) calculated for respective one(s) of the wheels 104A, 104B, 104C, 104D, the front axle mass of the front axle 110A, the rear axle mass of the rear axle 110B, and/or the vehicle mass of the vehicle 100.

FIG. 10 is a flowchart representative of example machine readable instructions and/or example operations 1000 that may be executed, instantiated, and/or performed by the example mass estimation circuitry 102 of FIGS. 1, 2, and/or 5 to determine a current position of the vehicle body 106 of the example vehicle 100 of FIG. 1 (e.g., in association with block 910 of FIG. 9). The example machine-readable instructions and/or the example operations 1000 of FIG. 10 begin at block 1002, at which the example mass estimation circuitry 102 determines an example body coordinate transform based on body sensor measurements included in the example body sensor data 522. For example, the example body position calculation circuitry 508 of FIG. 5 determines, based on the body sensor measurements, angular rotation of the body sensor 116 and, thus, the vehicle body 106 relative to the example global coordinate system 126 of the vehicle 100. For example, the body coordinate transform represents an angular rotation about the global x-axis 128A and/or the global y-axis 128B of FIG. 1 to align the body z-axis 120C and the global z-axis 128C of FIG. 1. In some examples, the body position calculation circuitry 508 calculates the body coordinate transform based on a difference between an expected acceleration of the body sensor 116 in a neutral configuration (e.g., (0, 0, −9.81 m/s$^2$)) and the measured acceleration (e.g., an actual acceleration) of the body sensor 116.

At block 1004, the example mass estimation circuitry 102 determines adjusted design positions of the example reference points 216. For example, the body position calculation circuitry 508 determines the adjusted design positions for one(s) of the reference points 216 and/or the sensor axes 124A, 124B, 124C by mapping, using the body coordinate transform, the design positions from the global coordinate system 126 to the body coordinate system 118 of FIG. 1.

At block 1006, the example mass estimation circuitry 102 determines one or more local design gravity vectors. For example, the body position calculation circuitry 508 determines, based on the adjusted design positions of the sensor axes 124A, 124B, 124C of the respective suspension sensors 114A, 114B, 114C, 114D, the local design gravity vectors corresponding to respective ones of the suspension sensors 114A, 114B, 114C, 114D in the design position. In some examples, the local design gravity vectors represent a direction of gravity relative to the sensor coordinate systems 122 of the respective suspension sensors 114A, 114B, 114C, 114D in the design position.

FIG. 11 is a flowchart representative of example machine readable instructions and/or example operations 1100 that may be executed, instantiated, and/or performed by the example mass estimation circuitry 102 of FIGS. 1, 2, and/or 5 to determine current position(s) of one or more suspension components of the example vehicle 100 of FIG. 1 (e.g., in association with block 912 of FIG. 9). The example machine-readable instructions and/or the example operations 1100 of FIG. 11 begin at block 1102, at which the example mass estimation circuitry 102 determines a local current gravity vector for a respective one of the suspension sensors 114A, 114B, 114C, 114D (e.g., the first suspension sensor 114A). For example, the example suspension position calculation circuitry 510 of FIG. 5 determines the local current gravity vector for the first suspension sensor 114A based acceleration measurements included in the suspension sensor data 521 from the first suspension sensor 114A. In some examples, the local current gravity vector represents a direction of gravity (e.g., relative to the sensor coordinate system 220 of the first suspension sensor 114A) when the first suspension system 112A is in the current position.

At block 1104, the example mass estimation circuitry 102 determines a change in the local gravity vectors between the design position and the current position. For example, the suspension position calculation circuitry 510 calculates a change (e.g., an angular difference) between the local design gravity vector and the local current gravity vector in the sensor coordinate system 122 of the first suspension sensor 114A.

At block 1106, the example mass estimation circuitry 102 determines a current position of the first suspension sensor 114A. For example, the suspension position calculation circuitry 510 determines the current position of the first suspension sensor 114A with respect to the global coordinate system 126 by executing example Equations 1, 2, 3, 4, 5, and/or 6 above based on the design position of the first suspension sensor 114A in the global coordinate system 126, the design position of the second reference point 216B in the global coordinate system 126, an example unit vector from the second reference point 216B to the third reference point 216C, the local design gravity vector of the first suspension sensor 114A, and the local current gravity vector of the first suspension sensor 114A.

At block 1108, the example mass estimation circuitry 102 determines one or more example coordinate transforms (e.g., local coordinate transforms) for the current position. For example, the suspension position calculation circuitry 510 determines the coordinate transforms for transforming position data (e.g., the current position(s) of the first suspension sensor(s) 114A) into one or more local coordinate systems defined at first the suspension systems 112A. In some examples, the suspension position calculation circuitry 510 utilizes the coordinate transforms to transform one(s) of the design positions and/or the current positions of one or more of the reference points 216 into one(s) of the local coordinate systems.

At block 1110, the example mass estimation circuitry 102 determines a current position of the example lower ball joint 218 of the first suspension system 112A of FIG. 2. For example, the suspension position calculation circuitry 510 determines the current position of the fourth reference point 216D corresponding to the lower ball joint 218 based on the design positions of the first and second example bushings 210, 212, the current position and/or orientation of the first suspension sensor 114A, and/or a control arm length of the control arm 202 (e.g., between the second and fourth reference points 216B, 216D).

At block 1112, the example mass estimation circuitry 102 determines a current position of the lower strut joint 310. For example, the suspension position calculation circuitry 510 determines the current position of the sixth reference point 216F corresponding to the lower strut joint 310 based on the design positions of the first and second example bushings 210, 212, the orientation of the first suspension sensor 114A, the control arm length of the control arm 202, and/or a first knuckle length of the example knuckle 206 (e.g., between the fourth and sixth reference points 216D, 216F).

At block 1114, the example mass estimation circuitry 102 determines a current position of the example steering link joint 402 of the first suspension system 112A. For example, the suspension position calculation circuitry 510 determines the current position of the ninth reference point 216I corresponding to the steering link joint 402 based on the design positions of the first and second example bushings 210, 212, the orientation of the first suspension sensor 114A, the control arm length of the control arm 202, and/or a second knuckle length of the example knuckle 206 (e.g., between the fourth and ninth reference points 216D, 216I).

At block 1116, the example mass estimation circuitry 102 determines a current position of a wheel center of the first wheel 104A. For example, the suspension position calculation circuitry 510 determines the current position of the wheel center based on the design position of the wheel center and/or the current positions of one or more of the reference points 216 on the knuckle 206 and/or the control arm 202.

At block 1118, the example mass estimation circuitry 102 determines a current angle of one or more control arm bushings (e.g., the first bushing 210 and/or the second bushing 212) of the first suspension system 112A. For example, the suspension position calculation circuitry 510 determines the current angle based on the design positions of the first and second bushings 210, 212 and the current position of the lower ball joint 218.

At block 1120, the example mass estimation circuitry 102 determines current length(s) of the spring 302 and/or one or more dampers (e.g., a jounce bumper and/or a rebound bumper) of the first suspension system 112A. For example, the suspension position calculation circuitry 510 determines the current length(s) of the spring 302, the jounce bumper, and/or the rebound bumper based on the current position of the lower strut joint 310.

At block 1122, the example mass estimation circuitry 102 determines a current camber angle, a current caster angle, and/or a current toe angle of the first wheel 104A. For example, the suspension position calculation circuitry 510 determines the current camber angle, the current caster angle, and/or the current toe angle based on the current position of the wheel center of the wheel 104A.

At block 1124, the example mass estimation circuitry 102 determines whether there are any additional one(s) of the suspension systems 112B, 112C, 112D to analyze (e.g., to determine current position(s) corresponding to the one(s) of the suspension systems 112B, 112C, 112D). In response to the suspension position calculation circuitry 510 determining that there are one or more additional suspension systems to analyze (e.g., block 1124 returns a result of YES), control returns to block 1102. Alternatively, in response to the suspension position calculation circuitry 510 determining that there are no more suspension systems to analyze (e.g., block 1124 returns a result of NO), control proceeds to block 914 of FIG. 9.

Figure 12:
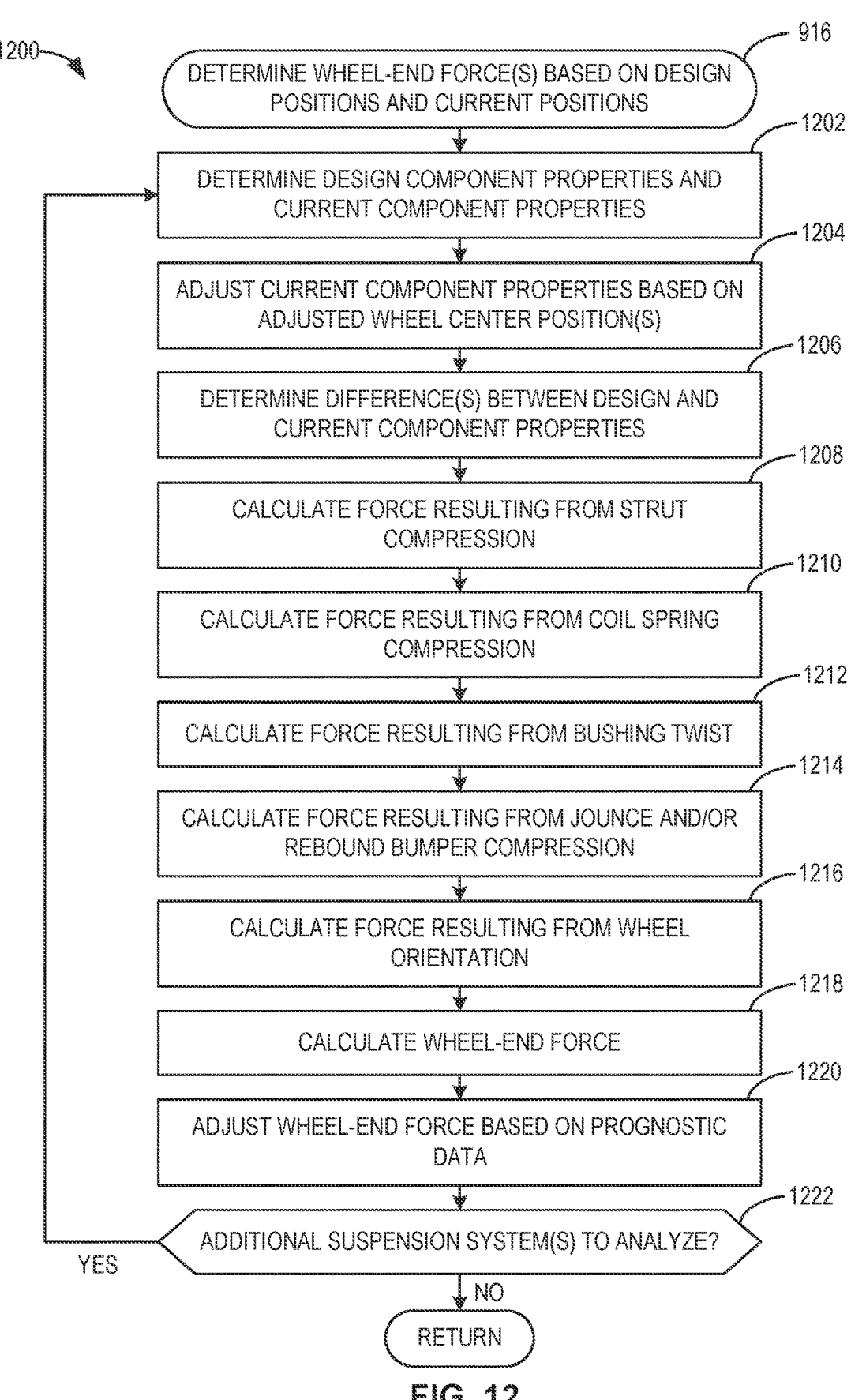
FIG. 12 is a flowchart representative of example machine readable instructions and/or example operations that may be executed, instantiated, and/or performed by the example mass estimation circuitry of FIGS. 1 and/or 5 to determine wheel-end forces for corresponding example suspension systems of the example vehicle of FIG. 1.

FIG. 12 is a flowchart representative of example machine readable instructions and/or example operations 1200 that may be executed, instantiated, and/or performed by the example mass estimation circuitry 102 of FIGS. 1, 2, and/or 5 to determine wheel-end force(s) for corresponding one(s) of the suspension systems 112A, 112B, 112C, 112D of the example vehicle 100 of FIG. 1 (e.g., in association with block 916 of FIG. 9). The example machine-readable instructions and/or the example operations 1100 of FIG. 11 begin at block 1102, at which the example mass estimation circuitry 102 determines and/or obtains example design component properties and corresponding example current component properties associated with a respective one of the suspension systems 112A, 112B, 112C, 112D (e.g., the first suspension system 112A). For example, the example force estimation circuitry 514 of FIG. 5 determines, based on the design positions of one(s) of the reference points 216, the design component properties including lengths of one or more suspension components (e.g., a strut length, a coil spring length, a jounce bumper length, a rebound bumper length, etc.) and/or angles between ones of the suspension components (e.g., a control arm angle, a camber angle, a caster angle, etc.) corresponding to the first suspension system 112A in the design position. Further, the force estimation circuitry 514 determines, based on the current positions of one(s) of the reference points 216, the current component properties including the lengths and/or the angles of the suspension component(s) corresponding to the first suspension system 112A in the current position.

At block 1204, the example mass estimation circuitry 102 adjusts the current component properties based on adjusted wheel center positions. For example, the force estimation circuitry 514 adjusts the current component properties based on the adjusted wheel center positions determined by the position adjustment circuitry 512 at block 914 of FIG. 9.

At block 1206, the example mass estimation circuitry 102 determines difference(s) between the design component properties and the corresponding current component properties. For example, the force estimation circuitry 514 determines a compression amount (e.g., a strut compression of the strut assembly 204, a spring compression of the spring 302, a jounce bumper compression of the jounce bumper, a rebound bumper compression of the rebound bumper, etc.) and/or a twist angle (e.g., a first twist angle of the first bushing 210, a second twist angle of the second bushing 210, etc.) of respective suspension component(s) of the first suspension system 112A based on the difference(s) between the design component properties and the current component properties. In some examples, the force estimation circuitry 514 determines a change in wheel orientation (e.g., a change in camber angle, a change in caster angle, and/or a change in toe angle) of the first wheel 104A based on the difference(s) between the design component properties and the current component properties.

At block 1208, the example mass estimation circuitry 102 calculates a first example force (e.g., a first component force) resulting from the strut compression. For example, the force estimation circuitry 514 calculates the first force based on the first compression amount of the strut assembly 204 and the strut spring rate of the strut assembly 204.

At block 1210, the example mass estimation circuitry 102 calculates a second example force (e.g., a second component force) resulting from the spring compression. For example, the force estimation circuitry 514 calculates the second force based on the spring compression amount of the spring 302 and a coil spring rate of the spring 302.

At block 1212, the example mass estimation circuitry 102 calculates third and fourth example forces (e.g., third and fourth component forces) resulting from the twist of the bushings 210, 212. For example, the force estimation circuitry 514 calculates the third force based on a first twist angle of the first bushing 210 and a first bushing spring rate of the first bushing 210. In some examples, the force estimation circuitry 514 calculates the fourth force based on a second twist angle of the second bushing 212 and a second bushing spring rate of the second bushing 212.

At block 1214, the example mass estimation circuitry 102 calculates fifth and sixth example forces (e.g., fifth and sixth component forces) resulting from the compression of the jounce bumper and/or the rebound bumper. For example, the force estimation circuitry 514 calculates the fifth force based on a compression amount of the jounce bumper and a jounce bumper spring rate. In some examples, the force estimation circuitry 514 calculates the sixth force based on a compression amount of the rebound bumper and a rebound bumper spring rate.

At block 1216, the example mass estimation circuitry 102 calculates a seventh example force resulting from the wheel orientation of the first wheel 104A. For example, the force estimation circuitry 514 calculates the seventh force based on a change in wheel orientation (e.g., a change in toe angle, camber angle, and/or caster angle) of the first wheel 104A.

At block 1218, the example mass estimation circuitry 102 calculates an example wheel-end force corresponding to the first wheel 104A and/or the first suspension system 112A. For example, the force estimation circuitry 514 determines the wheel-end force based on an aggregation (e.g., a sum) of the first force associated with the strut assembly 204, the second force associated with the spring 302, the third force associated with the first bushing 210, the fourth force associated with the second bushing 212, the fifth force associated with the jounce bumper, the sixth force associated with the rebound bumper, and/or the seventh force associated with the wheel orientation.

At block 1220, the example mass estimation circuitry 102 adjusts the wheel-end force based on prognostic data. For example, the force estimation circuitry 514 adjusts the wheel-end force based on the prognostic data including, for example, an expected life cycle (e.g., fatigue life) of one or more of the suspension components (e.g., the spring 302, the jounce jumper, the rebound bumper, the first bushing 210, the second bushing 212, etc.) of the first suspension system 112A.

At block 1222, the example mass estimation circuitry 102 determines whether there are any additional one(s) of the suspension systems 112B, 112C, 112D to analyze (e.g., for which the wheel-end force(s) corresponding to the one(s) of the suspension systems 112B, 112C, 112D are to be determined). In response to the force estimation circuitry 514 determining that there are one or more additional suspension systems to analyze (e.g., block 1222 returns a result of YES), control returns to block 1202. Alternatively, in response to the force estimation circuitry 514 determining that there are no more suspension systems to analyze (e.g., block 1222 returns a result of NO), control proceeds to block 918 of FIG. 9.

Figure 13:
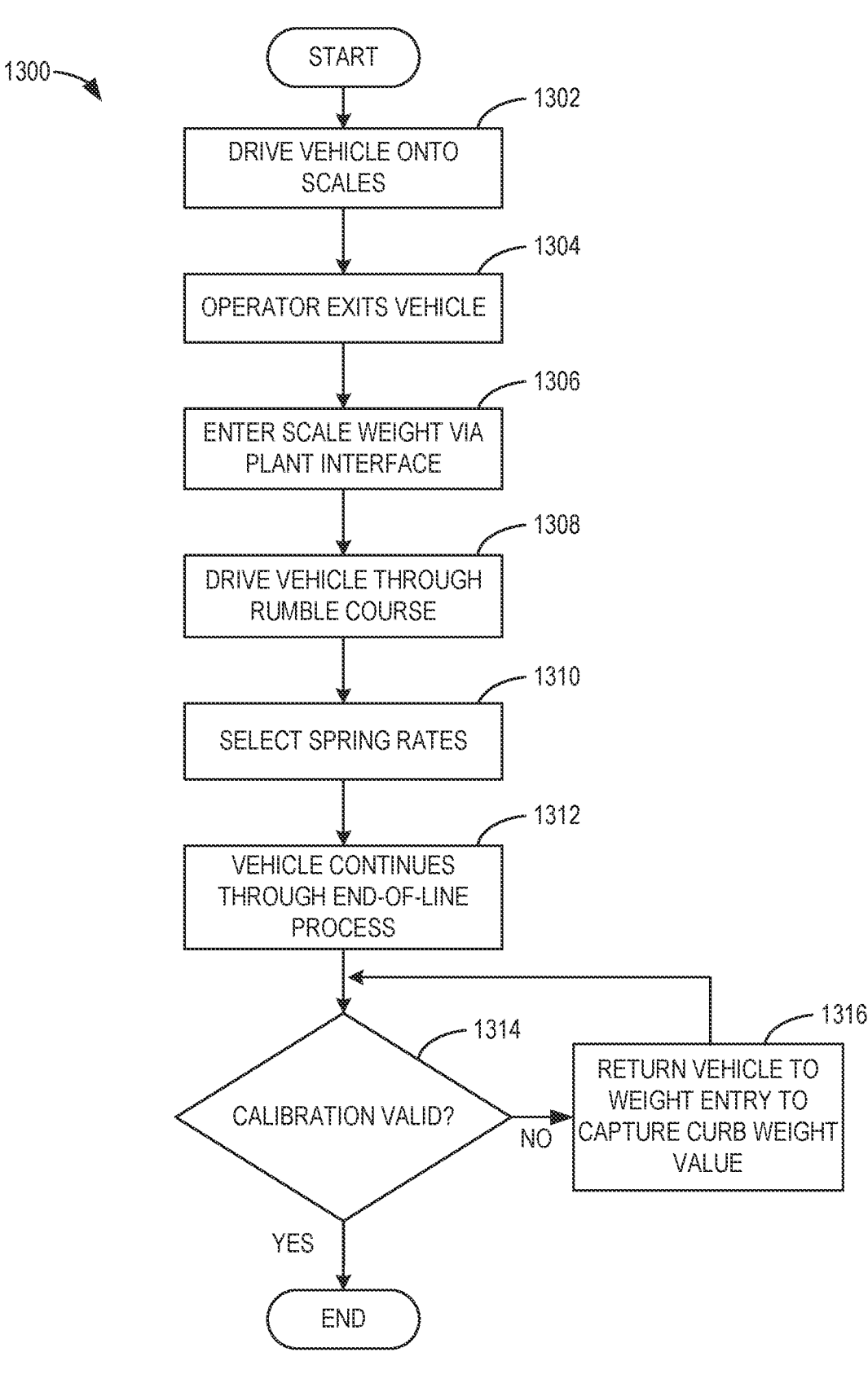
FIG. 13 is a flowchart representative of an example production calibration process to calibrate the mass estimation circuitry of FIGS. 1 and/or 5.

FIG. 13 is a flowchart representative of an example production calibration process 1300 to calibrate a weight estimation system (e.g., the mass estimation circuitry 102 of FIGS. 1 and/or 5) of the example vehicle 100 of FIG. 1. In some examples, the example production calibration process 1300 of FIG. 13 is performed by an operator at a vehicle production facility (e.g., a manufacturing plant) during an end-of-line (EOL) process of the vehicle 100. In this example, the production calibration process 1300 begins when the vehicle 100 is assembled and the vehicle 100 is driven onto scales (block 1302). An operator exits the vehicle 100 (block 1304), and a scale weight measured by the scales is entered via a plant interface (block 1306). The vehicle 100 is driven through a rumble course (block 1308), and example spring rate(s) (e.g., supplier-provided spring rate(s)) can be selected for one or more suspension components (e.g., the spring 302, the bushings 210, 212, a jounce bumper, a rebound bumper, etc.) of the respective suspension systems 112A, 112B, 112C, 112D of the vehicle 100 (block 1310).

In the example of FIG. 13, the vehicle 100 continues through the EOL process (block 1312), after which an operator determines whether the calibration performed for the vehicle 100 is valid (block 1314). In some examples, the operator determines that the calibration is valid based on whether data values associated with the calibration process have been populated and/or updated, and/or whether the data values are within an expected range. In response to the operator determining that the calibration is not valid (e.g., block 1314 returns a result of NO), the vehicle 100 can be returned to the scales to capture the curb weight of the vehicle 100 and/or to repeat the calibration procedure (block 1316). Alternatively, in response to the operator determining that the calibration is valid (e.g., block 1314 returns a result of YES), the calibration process ends and the vehicle 100 is ready for delivery (e.g., to a customer).

Figure 14:
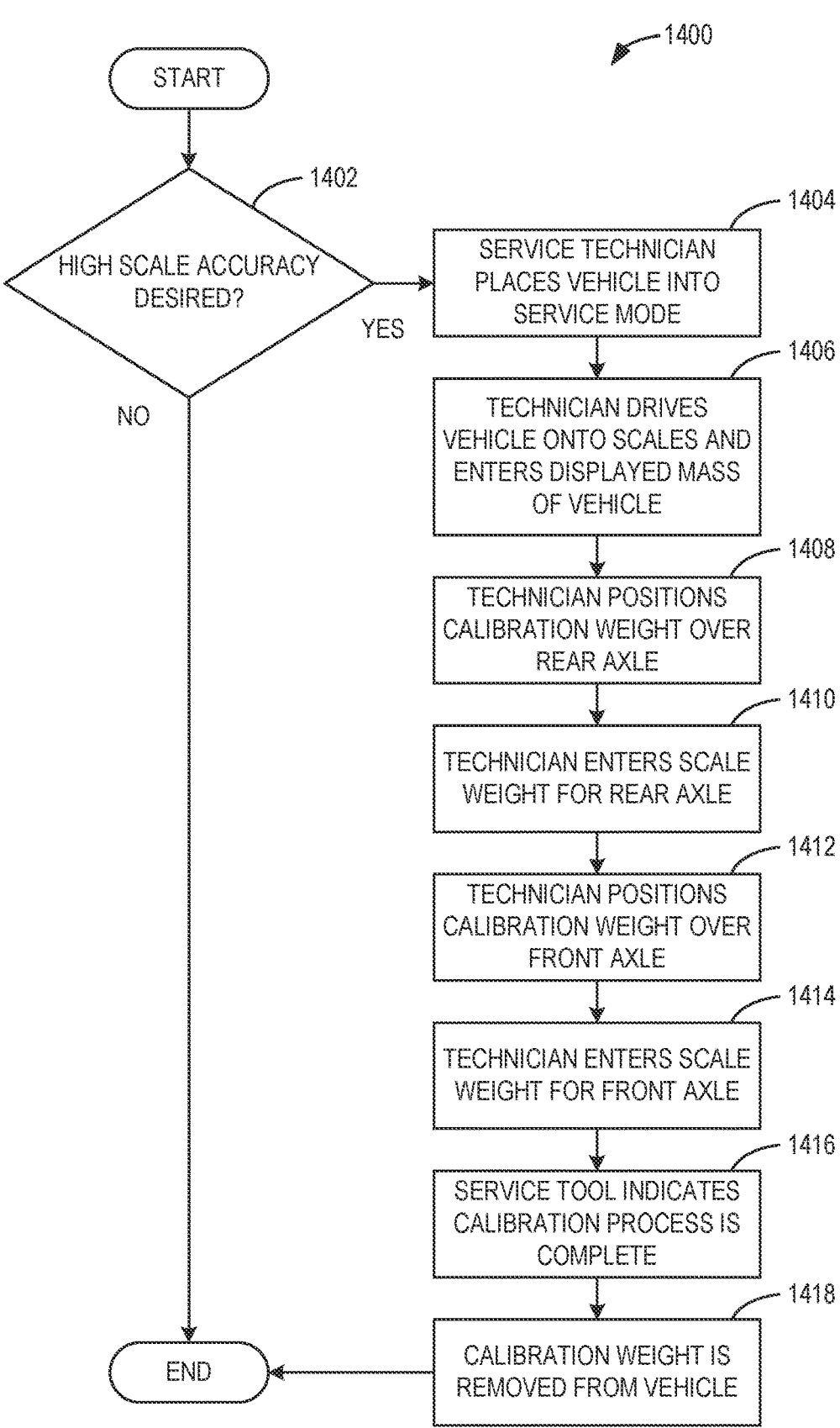
FIG. 14 is a flowchart representative of an example post-production calibration process to calibrate the mass estimation circuitry of FIGS. 1 and/or 5.

FIG. 14 is a flowchart representative of an example post-production calibration process 1400 to calibrate a weight estimation system (e.g., the mass estimation circuitry 102 of FIGS. 1 and/or 5) of the example vehicle 100 of FIG. 1. In some examples, the example post-production calibration process 1400 of FIG. 14 can be performed by an operator at a vehicle service facility to calibrate and/or re-calibrate the vehicle 100 (e.g., after repair and/or replacement of one or more parts of the vehicle 100). In some examples, the post-production calibration process 1400 begins when a new vehicle (e.g., the vehicle 100) is purchased by a customer. When the customer does not desire and/or expect high accuracy of mass estimation for the vehicle 100 (e.g., block 1402 returns a result of NO), the post-production calibration process 1400 and the vehicle 100 is ready for customer use.

Alternatively, if the customer desires and/or expects high accuracy mass estimation for the vehicle 100 (e.g., block 1402 returns a result of YES), the process proceeds to block 1404 at which a technician (e.g., a service technician) places the vehicle 100 into service mode. The technician drives the vehicle 100 onto scales and enters (e.g., via an example service tool) a baseline vehicle mass displayed by the scales (block 1406). In some examples, the technician positions a calibration weight (e.g., a calibration load) over the rear axle 110B of the vehicle 100 (block 1408), and the technician enters (e.g., via the service tool) the scale weight output by the scales for the rear axle 110B (block 1410). Further, the technician positions the calibration weight over the front axle 110A of the vehicle 100 (block 1412) and enters the scale weight output by the scales for the front axle 110A (block 1414). In some examples, additionally or alternatively, the technician positions a single calibration weight at a centerline of the vehicle 100 between the front and rear axles 110A, 110B, and the technician enters the scale weight(s) output by the scales for respective one(s) of wheel 104A, 104B, 104C, 104D. In some examples, the service tool indicates that the calibration process is complete (block 1416). In such examples, the calibration weight is removed from the vehicle 100 (block 1418), and the vehicle 100 is ready for customer use.

Figure 15:
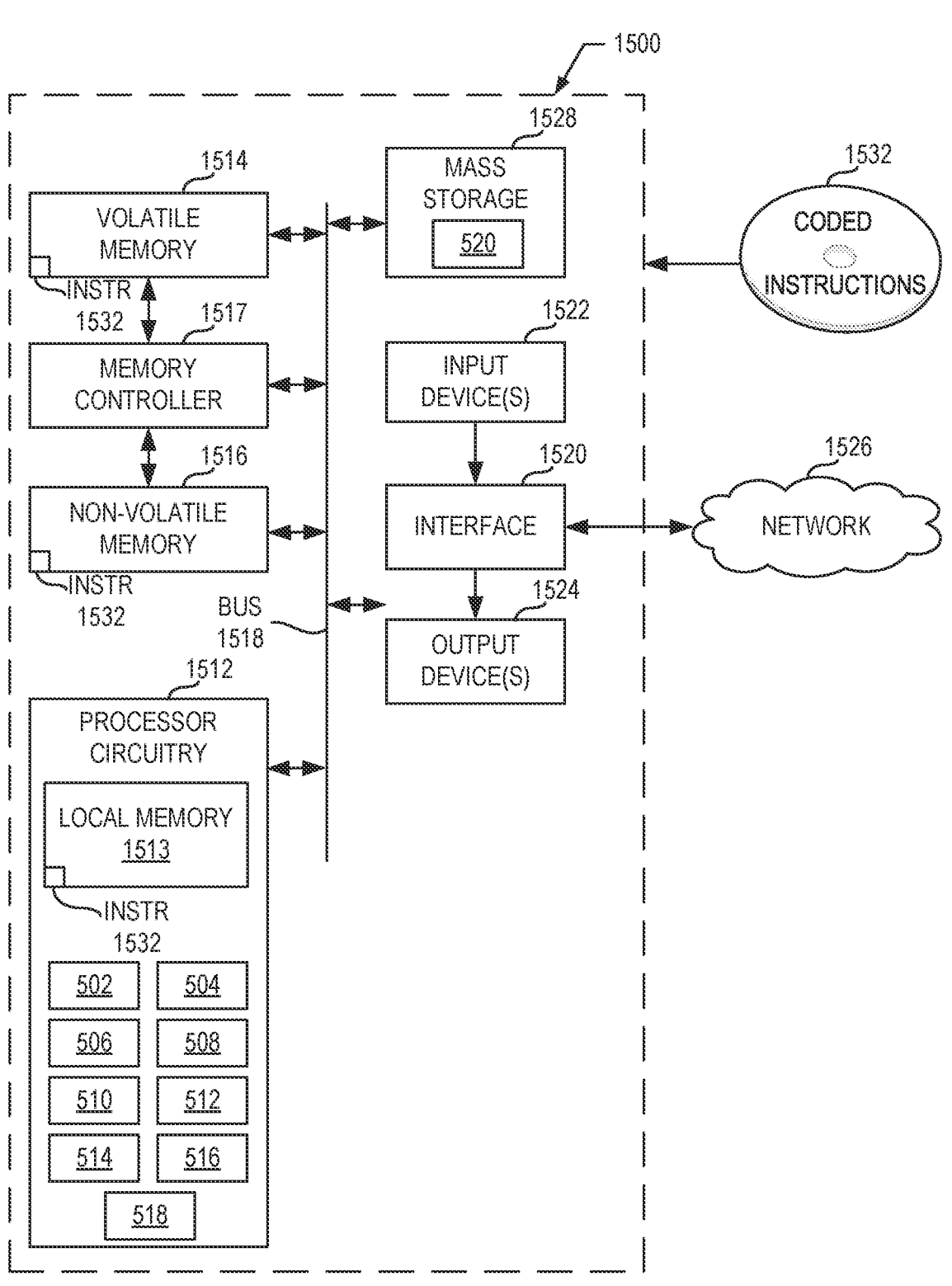
FIG. 15 is a block diagram of an example processing platform including programmable circuitry structured to execute, instantiate, and/or perform the example machine readable instructions and/or perform the example operations of FIGS. 9, 10, 11, and/or 12 to implement the mass estimation circuitry of FIGS. 1 and/or 5.

FIG. 15 is a block diagram of an example programmable circuitry platform 1500 structured to execute and/or instantiate the example machine-readable instructions and/or the example operations of FIGS. 9, 10, 11, and/or 12 to implement the mass estimation circuitry 102 of FIG. 5. The programmable circuitry platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1500 of the illustrated example includes programmable circuitry 1512. The programmable circuitry 1512 of the illustrated example is hardware. For example, the programmable circuitry 1512 can be implemented by one or more integrated circuits, logic circuits, FPGAs, microprocessors, CPUs, GPUs, DSPs, and/or microcontrollers from any desired family or manufacturer. The programmable circuitry 1512 may be implemented by one or more semiconductor based (e.g., silicon based) devices. In this example, the programmable circuitry 1512 implements the example input interface circuitry 502, the example normalization circuitry 504, the example sensor calibration circuitry 506, the example body position calculation circuitry 508, the example suspension position calculation circuitry 510, the example position adjustment circuitry 512, the example force estimation circuitry 514, the example vehicle mass estimation circuitry 516, the example user interface circuitry 518, and the example database 520.

The programmable circuitry 1512 of the illustrated example includes a local memory 1513 (e.g., a cache, registers, etc.). The programmable circuitry 1512 of the illustrated example is in communication with main memory 1514, 1516, which includes a volatile memory 1514 and a non-volatile memory 1516, by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517. In some examples, the memory controller 1517 may be implemented by one or more integrated circuits, logic circuits, microcontrollers from any desired family or manufacturer, or any other type of circuitry to manage the flow of data going to and from the main memory 1514, 1516.

The programmable circuitry platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1522 are connected to the interface circuitry 1520. The input device(s) 1522 permit(s) a user (e.g., a human user, a machine user, etc.) to enter data and/or commands into the programmable circuitry 1512. The input device(s) 1522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1524 are also connected to the interface circuitry 1520 of the illustrated example. The output device(s) 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1500 of the illustrated example also includes one or more mass storage discs or devices 1528 to store firmware, software, and/or data. Examples of such mass storage discs or devices 1528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1532, which may be implemented by the machine readable instructions of FIGS. 9, 10, 11, and/or 12, may be stored in the mass storage device 1528, in the volatile memory 1514, in the non-volatile memory 1516, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that estimate mass for a vehicle. Example mass estimation circuitry disclosed herein utilize measurement data from one or more acceleration sensors (e.g., tri-axis accelerometers) to estimate relative locations of reference points on the vehicle between a first position (e.g., a design position) and a second position (e.g., a current position) of the vehicle. In such examples, based on the differences between corresponding reference points in the first and second positions, the mass estimation circuitry estimates wheel-end forces corresponding to respective wheels of the vehicle, and further estimates at least one of a front axle mass, a rear axle mass, or a vehicle mass (e.g., a total vehicle mass) based on ones of the wheel-end forces. By utilizing acceleration sensors to indirectly sense positions of moving suspension system components, examples disclosed herein can be utilized for different suspension types and/or geometries without necessitating the use of complex, multi-part mechanical linkage systems (as commonly used with rotary and/or linear suspension position sensors), thereby reducing manufacturing and/or part costs associated with the vehicle. Further, examples disclosed herein can utilize prognostic feedback to account for aging and/or wear of suspension components, thereby improving accuracy of mass estimation compared to known transfer-function based mass estimation techniques. Additionally, examples disclosed herein do not necessitate calibration for a gross axle weight rating (GAWR) and/or a gross vehicle weight rating (GVWR) on a per-vehicle basis, thus reducing time and/or service costs associated with manufacture of the vehicle. As a result, disclosed systems, apparatus, articles of manufacture, and methods improve the efficiency of using a computing device by reducing processing resources required for such calibration. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture for mass estimation for a vehicle are disclosed herein. Further examples and combinations thereof include the following:

Example 1 includes an apparatus comprising interface circuitry, machine-readable instructions, and at least one processor circuit to be programmed by the machine-readable instructions to determine a first position of a first reference point on a suspension system of a vehicle, the first position corresponding to the vehicle in a first state, determine a second position of the first reference point based on (a) sensor data from an accelerometer positioned on the suspension system and (b) relative positions of second reference points on the suspension system, the second position corresponding to the vehicle in a second state, determine, based on the first and second positions, a wheel-end force corresponding to a wheel of the vehicle, determine, based on the wheel-end force, an axle mass corresponding to an axle of the vehicle, and determine, based on the axle mass, a vehicle mass of the vehicle.

Example 2 includes the apparatus of example 1, wherein the accelerometer is positioned on a movable linkage of the suspension system.

Example 3 includes the apparatus of example 1, wherein one or more of the at least one processor circuit is to determine the first position based on a computer aided design model of the vehicle.

Example 4 includes the apparatus of example 1, wherein one or more of the at least one processor circuit is to determine the wheel-end force based on a component force corresponding to at least one component of the suspension system, the component force based on (a) a displacement between the first position and the second position and (b) at least one component property associated with the suspension system.

Example 5 includes the apparatus of example 4, wherein the at least one component property includes a spring rate corresponding to at least one of a spring of the suspension system, a bushing of the suspension system, a strut of the suspension system, or a bumper of the suspension system.

Example 6 includes the apparatus of example 1, wherein the accelerometer is a first accelerometer, the sensor data is first sensor data, and wherein one or more of the at least one processor circuit is to adjust the relative positions of the second reference points based on second sensor data from a second accelerometer, the second accelerometer positioned on and rotatable with a body of the vehicle.

Example 7 includes the apparatus of example 1, wherein one or more of the at least one processor circuit is to cause presentation of the vehicle mass via a user interface.

Example 8 includes At least one non-transitory machine-readable medium comprising machine-readable instructions to cause at least one processor circuit to at least determine a first position of a first reference point on a suspension system of a vehicle, the first position corresponding to the vehicle in a first state, determine a second position of the first reference point based on (a) sensor data from an accelerometer positioned on the suspension system and (b) relative positions of second reference points on the suspension system, the second position corresponding to the vehicle in a second state, determine, based on the first and second positions, a wheel-end force corresponding to a wheel of the vehicle, determine, based on the wheel-end force, an axle mass corresponding to an axle of the vehicle, and determine, based on the axle mass, a vehicle mass of the vehicle.

Example 9 includes the at least one non-transitory machine-readable medium of example 8, wherein the accelerometer is positioned on a movable linkage of the suspension system.

Example 10 includes the at least one non-transitory machine-readable medium of example 8, wherein the machine-readable instructions are to cause one or more of the at least one processor circuit to determine the first position based on a computer aided design model of the vehicle.

Example 11 includes the at least one non-transitory machine-readable medium of example 8, wherein the machine-readable instructions are to cause one or more of the at least one processor circuit to determine the wheel-end force based on a component force corresponding to at least one component of the suspension system, the component force based on (a) a displacement between the first position and the second position, and (b) at least one component property associated with the suspension system.

Example 12 includes the at least one non-transitory machine-readable medium of example 11, wherein the at least one component property includes a spring rate corresponding to at least one of a spring of the suspension system, a bushing of the suspension system, a strut of the suspension system, or a bumper of the suspension system.

Example 13 includes the at least one non-transitory machine-readable medium of example 8, wherein the accelerometer is a first accelerometer, the sensor data is first sensor data, and wherein the machine-readable instructions are to cause one or more of the at least one processor circuit to adjust the relative positions of the second reference points based on second sensor data from a second accelerometer, the second accelerometer positioned on and rotatable with a body of the vehicle.

Example 14 includes the at least one non-transitory machine-readable medium of example 8, wherein the machine-readable instructions are to cause one or more of the at least one processor circuit to cause presentation of the vehicle mass via a user interface.

Example 15 includes a method comprising determining a first position of a first reference point on a suspension system of a vehicle, the first position corresponding to the vehicle in a first state, determining a second position of the first reference point based on (a) sensor data from an accelerometer positioned on the suspension system and (b) relative positions of second reference points on the suspension system, the second position corresponding to the vehicle in a second state, determining, based on the first and second positions, a wheel-end force corresponding to a wheel of the vehicle, determining, based on the wheel-end force, an axle mass corresponding to an axle of the vehicle, and determining, based on the axle mass, a vehicle mass of the vehicle.

Example 16 includes the method of example 15, wherein the accelerometer is positioned on a movable linkage of the suspension system.

Example 17 includes the method of example 15, further including determining the first position based on a computer aided design model of the vehicle.

Example 18 includes the method of example 15, further including determining the wheel-end force based on a component force corresponding to at least one component of the suspension system, the component force based on (a) a displacement between the first position and the second position, and (b) at least one component property associated with the suspension system.

Example 19 includes the method of example 18, wherein the at least one component property includes a spring rate corresponding to at least one of a spring of the suspension system, a bushing of the suspension system, a strut of the suspension system, or a bumper of the suspension system.

Example 20 includes the method of example 15, wherein the accelerometer is a first accelerometer, the sensor data is first sensor data, and further including adjusting the relative positions of the second reference points based on second sensor data from a second accelerometer, the second accelerometer positioned on and rotatable with a body of the vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry;
machine-readable instructions; and
at least one processor circuit to be programmed by the machine-readable instructions to:
   determine a first position of a first reference point on a suspension system of a vehicle, the first position corresponding to the vehicle in a first state;
   determine a second position of the first reference point based on (a) sensor data from an accelerometer positioned on the suspension system and (b) relative positions of second reference points on the suspension system, the second position corresponding to the vehicle in a second state;
   determine, based on the first and second positions, a wheel-end force corresponding to a wheel of the vehicle;
   adjust the determined wheel-end force based on prognostic data corresponding to at least one component of the suspension system, the prognostic data including a difference between an expected fatigue life of the at least one component and a current age of the at least one component;
   determine, based on the adjusted wheel-end force, an axle mass corresponding to an axle of the vehicle;
   determine, based on the axle mass, a vehicle mass of the vehicle; and
   cause a user interface to output an alert when the determined vehicle mass exceeds a threshold.

2. The apparatus of claim 1, wherein the accelerometer is positioned on a movable linkage of the suspension system.

3. The apparatus of claim 1, wherein one or more of the at least one processor circuit is to determine the first position based on a computer aided design model of the vehicle.

4. The apparatus of claim 1, wherein one or more of the at least one processor circuit is to determine the wheel-end force based on a component force corresponding to at least one component of the suspension system, the component force based on (a) a displacement between the first position and the second position and (b) at least one component property associated with the suspension system.

5. The apparatus of claim 4, wherein the at least one component property includes a spring rate corresponding to at least one of a spring of the suspension system, a bushing of the suspension system, a strut of the suspension system, or a bumper of the suspension system.

6. The apparatus of claim 1, wherein the accelerometer is a first accelerometer, the sensor data is first sensor data, and wherein one or more of the at least one processor circuit is to adjust the relative positions of the second reference points based on second sensor data from a second accelerometer, the second accelerometer positioned on and rotatable with a body of the vehicle.

7. The apparatus of claim 1, wherein one or more of the at least one processor circuit is to cause presentation of the vehicle mass via the user interface.

8. At least one non-transitory machine-readable medium comprising machine-readable instructions to cause at least one processor circuit to at least:
   determine a first position of a first reference point on a suspension system of a vehicle, the first position corresponding to the vehicle in a first state;

determine a second position of the first reference point based on (a) sensor data from an accelerometer positioned on the suspension system and (b) relative positions of second reference points on the suspension system, the second position corresponding to the vehicle in a second state;
   determine, based on the first and second positions, a wheel-end force corresponding to a wheel of the vehicle;
   adjust the determined wheel-end force based on prognostic data corresponding to at least one component of the suspension system to increase accuracy of estimation of the wheel-end force, the prognostic data including a difference between an expected fatigue life of the at least one component and a current age of the at least one component;
   determine, based on the adjusted wheel-end force, an axle mass corresponding to an axle of the vehicle;
   determine, based on the axle mass, a vehicle mass of the vehicle; and
   cause a user interface to output an alert when the determined vehicle mass exceeds a threshold.

9. The at least one non-transitory machine-readable medium of claim 8, wherein the accelerometer is positioned on a movable linkage of the suspension system.

10. The at least one non-transitory machine-readable medium of claim 8, wherein the machine-readable instructions are to cause one or more of the at least one processor circuit to determine the first position based on a computer aided design model of the vehicle.

11. The at least one non-transitory machine-readable medium of claim 8, wherein the machine-readable instructions are to cause one or more of the at least one processor circuit to determine the wheel-end force based on a component force corresponding to at least one component of the suspension system, the component force based on (a) a displacement between the first position and the second position, and (b) at least one component property associated with the suspension system.

12. The at least one non-transitory machine-readable medium of claim 11, wherein the at least one component property includes a spring rate corresponding to at least one of a spring of the suspension system, a bushing of the suspension system, a strut of the suspension system, or a bumper of the suspension system.

13. The at least one non-transitory machine-readable medium of claim 8, wherein the accelerometer is a first accelerometer, the sensor data is first sensor data, and wherein the machine-readable instructions are to cause one or more of the at least one processor circuit to adjust the relative positions of the second reference points based on second sensor data from a second accelerometer, the second accelerometer positioned on and rotatable with a body of the vehicle.

14. The at least one non-transitory machine-readable medium of claim 8, wherein the machine-readable instructions are to cause one or more of the at least one processor circuit to cause presentation of the vehicle mass via the user interface.

15. A method comprising:
   determining a first position of a first reference point on a suspension system of a vehicle, the first position corresponding to the vehicle in a first state;
   determining a second position of the first reference point based on (a) sensor data from an accelerometer positioned on the suspension system and (b) relative positions of second reference points on the suspension system, the second position corresponding to the vehicle in a second state;

determining, based on the first and second positions, a wheel-end force corresponding to a wheel of the vehicle;

adjusting the determined wheel-end force based on prognostic data corresponding to at least one component of the suspension system to increase accuracy of estimation of the wheel-end force, the prognostic data including a difference between an expected fatigue life of the at least one component and a current age of the at least one component;

determining, based on the wheel-end force, an axle mass corresponding to an axle of the vehicle;

determining, based on the axle mass, a vehicle mass of the vehicle; and causing a user interface to output an alert when the determined vehicle mass exceeds a threshold.

16. The method of claim 15, wherein the accelerometer is positioned on a movable linkage of the suspension system.

17. The method of claim 15, further including determining the first position based on a computer aided design model of the vehicle.

18. The method of claim 15, further including determining the wheel-end force based on a component force corresponding to at least one component of the suspension system, the component force based on (a) a displacement between the first position and the second position, and (b) at least one component property associated with the suspension system.

19. The method of claim 18, wherein the at least one component property includes a spring rate corresponding to at least one of a spring of the suspension system, a bushing of the suspension system, a strut of the suspension system, or a bumper of the suspension system.

20. The method of claim 15, wherein the accelerometer is a first accelerometer, the sensor data is first sensor data, and further including adjusting the relative positions of the second reference points based on second sensor data from a second accelerometer, the second accelerometer positioned on and rotatable with a body of the vehicle.

* * * * *